United States Patent
Chatty

(10) Patent No.: US 11,194,050 B2
(45) Date of Patent: Dec. 7, 2021

(54) PROCESSING UNIT, SOFTWARE AND METHOD FOR CONTROLLING INTERACTIVE COMPONENTS

(71) Applicant: ECOLE NATIONALE DE L'AVIATION CIVILE, Toulouse (FR)

(72) Inventor: Stephane Chatty, Toulous (FR)

(73) Assignee: ECOLE NATIONALE DE L'AVIATION CIVILE, Toulouse (FR)

(*) Notice: Subject to any disclaimer, the term of this patent is extended or adjusted under 35 U.S.C. 154(b) by 231 days.

(21) Appl. No.: 15/186,028

(22) Filed: Jun. 17, 2016

(65) Prior Publication Data

US 2016/0371064 A1 Dec. 22, 2016

(30) Foreign Application Priority Data

Jun. 19, 2015 (EP) .................................... 15305949

(51) Int. Cl.
| | | |
|---|---|---|
| *G06F 3/0484* | (2013.01) | |
| *G06F 8/38* | (2018.01) | |
| *G01S 19/07* | (2010.01) | |
| *G06F 9/451* | (2018.01) | |
| *G01S 19/43* | (2010.01) | |
| *G01S 19/32* | (2010.01) | |
| *G01S 19/33* | (2010.01) | |
| *G01S 19/22* | (2010.01) | |
| *G01S 19/41* | (2010.01) | |
| *G01S 19/39* | (2010.01) | |
| *G01S 19/25* | (2010.01) | |

(52) U.S. Cl.
CPC ............ *G01S 19/072* (2019.08); *G01S 19/22* (2013.01); *G01S 19/25* (2013.01); *G01S 19/32* (2013.01); *G01S 19/33* (2013.01); *G01S 19/396* (2019.08); *G01S 19/41* (2013.01); *G01S 19/43* (2013.01); *G06F 3/0484* (2013.01); *G06F 8/38* (2013.01); *G06F 9/451* (2018.02)

(58) Field of Classification Search
CPC ............... G06F 8/34; G06F 8/20; G06F 3/048
See application file for complete search history.

(56) References Cited

U.S. PATENT DOCUMENTS

| | | | | |
|---|---|---|---|---|
| 5,485,600 A | * | 1/1996 | Joseph ...................... | G06F 8/34 703/13 |
| 5,652,888 A | * | 7/1997 | Burgess .................... | G06F 8/24 719/318 |

(Continued)

OTHER PUBLICATIONS

European Search Report for 15305949.8, dated Oct. 27, 2015.

*Primary Examiner* — Ryan F Pitaro
(74) *Attorney, Agent, or Firm* — Meagher Emanuel Laks Goldberg & Liao, LLP

(57) ABSTRACT

The invention relates to the development, control and execution of interactive software. An interactive component of the invention is configured to enable a defined interaction between the interactive digital system and an environment of the interactive digital system. It comprises a first subcomponent, defining a coupling between a second interactive component and a third interactive component. Said first subcomponent is configured, when executed by the interactive digital system, to generate an activation of the third interactive component conditional upon an activation of the second interactive component, said activation enabling the defined interaction.

11 Claims, 18 Drawing Sheets

(56) References Cited

U.S. PATENT DOCUMENTS

| | | | | |
|---|---|---|---|---|
| 5,850,548 | A * | 12/1998 | Williams | G06F 8/34 717/107 |
| 6,038,395 | A * | 3/2000 | Chow | G06F 9/465 717/105 |
| 6,104,393 | A * | 8/2000 | Santos-Gomez | G06F 9/451 715/763 |
| 6,437,805 | B1 * | 8/2002 | Sojoodi | G05B 19/0426 715/763 |
| 6,633,888 | B1 * | 10/2003 | Kobayashi | G06F 8/34 |
| 7,287,241 | B2 * | 10/2007 | Balsiger | G06F 9/451 717/105 |
| 7,580,678 | B2 * | 8/2009 | Byman-Kivivuori | G06Q 20/353 455/41.2 |
| 7,613,599 | B2 * | 11/2009 | Bade | G06F 30/33 703/14 |
| 7,958,454 | B2 * | 6/2011 | Gaudette | G06F 8/34 715/762 |
| 8,056,012 | B2 * | 11/2011 | Chen | G06F 8/34 715/750 |
| 8,205,120 | B2 * | 6/2012 | Heidasch | G06F 11/3688 714/25 |
| 8,352,903 | B1 * | 1/2013 | Friedman | G06F 8/30 717/100 |
| 8,365,138 | B2 * | 1/2013 | Iborra | G06F 8/30 717/104 |
| 8,677,262 | B2 * | 3/2014 | Baier | G05B 19/0426 715/772 |
| 8,683,426 | B2 * | 3/2014 | Englehart | G06F 8/34 700/29 |
| 8,732,596 | B2 * | 5/2014 | Thomson | G06F 8/34 715/763 |
| 8,782,558 | B1 * | 7/2014 | Biagiotti | G09G 3/006 715/823 |
| 9,046,881 | B2 * | 6/2015 | Blevins | G05B 19/0428 |
| 9,671,943 | B2 * | 6/2017 | Van der Velden | G06F 3/04847 |
| 9,766,953 | B2 * | 9/2017 | Beckett | G06F 9/541 |
| 10,146,197 | B2 * | 12/2018 | Kim | G06F 8/34 |
| 2004/0017392 | A1 * | 1/2004 | Welch | G06F 8/34 715/738 |
| 2006/0103633 | A1 * | 5/2006 | Gioeli | H04M 1/72522 345/173 |
| 2006/0156294 | A1 * | 7/2006 | Fuller, III | G06F 8/34 717/154 |
| 2008/0120258 | A1 * | 5/2008 | Shin | G06N 3/004 706/20 |
| 2008/0189536 | A1 * | 8/2008 | Mann | G06F 15/177 713/1 |
| 2008/0263521 | A1 * | 10/2008 | Neumann | G06F 9/4498 717/125 |
| 2008/0288878 | A1 * | 11/2008 | Hayashi | H04M 1/72547 715/762 |
| 2009/0049424 | A1 * | 2/2009 | Kumar | G06F 8/34 717/109 |
| 2011/0112790 | A1 * | 5/2011 | Lavie | G06F 11/263 702/123 |
| 2012/0005604 | A1 * | 1/2012 | Wirch | G06F 8/34 715/765 |
| 2013/0073993 | A1 * | 3/2013 | Schimpf | G06F 8/74 715/762 |
| 2013/0332905 | A1 * | 12/2013 | Vikutan | G06F 11/3684 717/124 |
| 2015/0339107 | A1 * | 11/2015 | Krishnamurthy | G06F 8/20 717/107 |
| 2017/0185383 | A1 * | 6/2017 | Sarkar | G06F 3/04842 |
| 2018/0013579 | A1 * | 1/2018 | Fairweather | H04L 67/125 |
| 2018/0196889 | A1 * | 7/2018 | Grossman | G06F 30/00 |
| 2019/0034209 | A1 * | 1/2019 | Donchev | G06F 3/0484 |

* cited by examiner

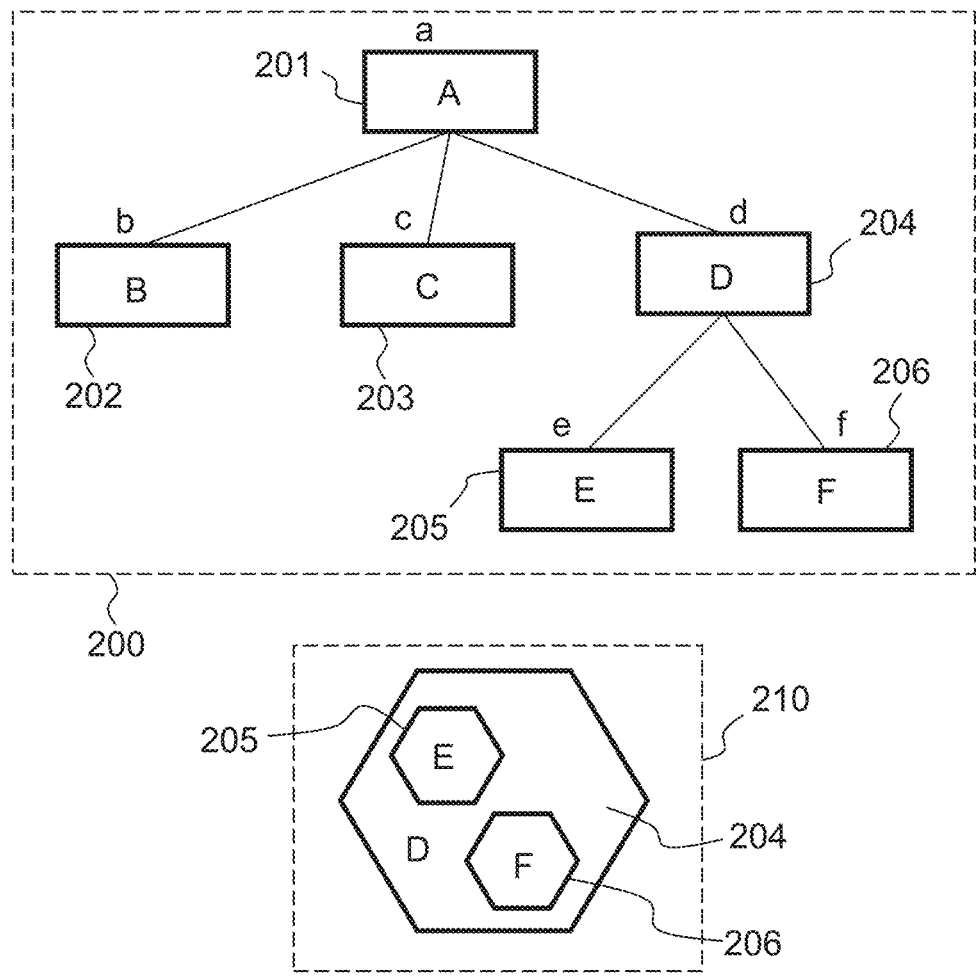
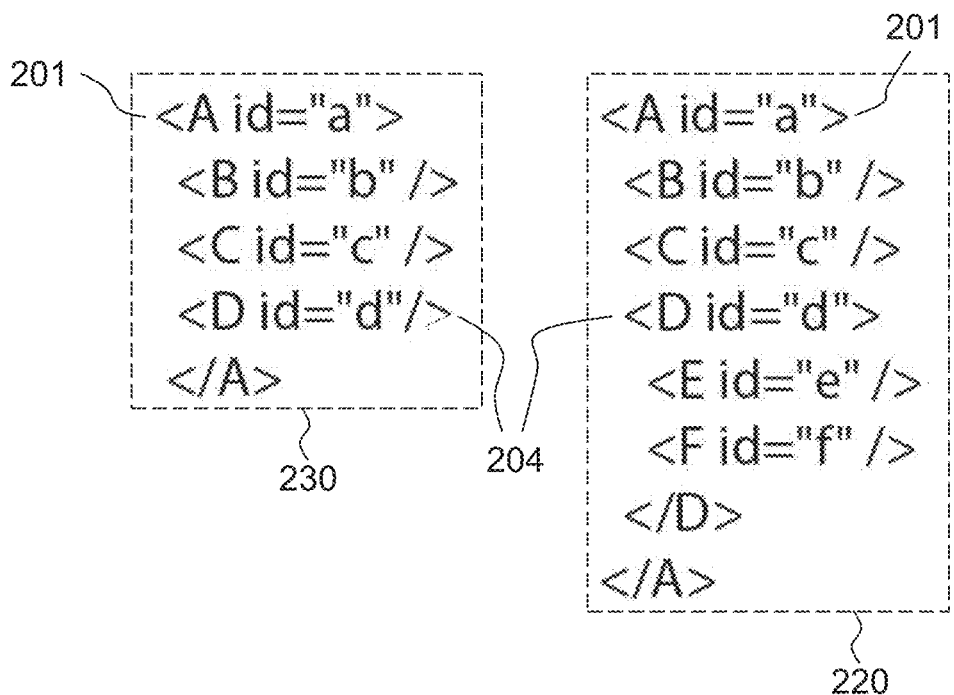
FIG.2

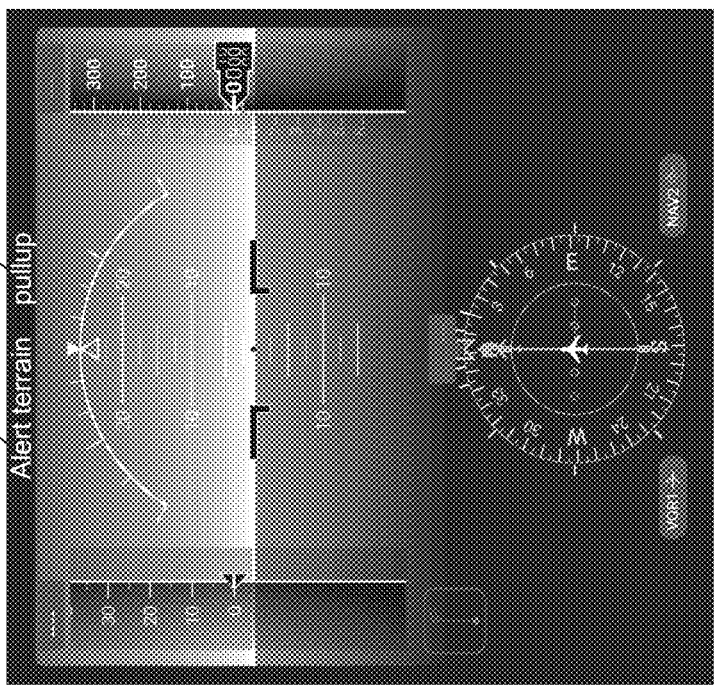

FIG.18

```
<component id="alarms" >
  <double id="threshold" value="0.000000" />
  <double id="altitude" value="1.000000" />
  <base:ascending-comparator id="ascending" left="1.000000" right="0.000000" />
  <connector id="altToLeft" in="altitude" out="ascending/left" />
  <connector id="thresToRight" in="threshold" out="ascending/right" />
  <base:switch id="switch" initial="false" >
    <component id="false" />
    <component id="true" >
      <graphics:group id="alarmsSVG" >
        <component id="AlarmTerrain" >                              1801
          <graphics:font-weight id="font-weight" weight="75" />
          <graphics:font-size id="font-size" unit="px" size="18.000000" />
          <graphics:font-family id="font-family" family="Roboto" />
          <graphics:fill-color id="fill" r="189.000000" g="55.000000" b="56.000000" />
          <graphics:fill-opacity id="fill-opacity" a="1.000000" />
          <graphics:font-size id="font-size" size="18.179200" />
          <graphics:no-outline id="no-stroke" />
          <graphics:text id="AlarmTerrain" x="234.926730" y="16.032656"
            dx="0.000000" dy="0.000000" encoding="UTF-8" text="Alert terrain" />
        </component>
        <component id="AlertPullUP" >                               1802
          <graphics:font-size id="font-size" size="18.179200" />
          <graphics:font-weight id="font-weight" weight="75" />
          <graphics:font-size id="font-size" unit="px" size="18.000000" />
          <graphics:font-family id="font-family" family="Roboto" />
          <graphics:fill-color id="fill" r="189.000000" g="55.000000" b="56.000000" />
          <graphics:fill-opacity id="fill-opacity" a="1.000000" />
          <graphics:no-outline id="no-stroke" />
          <graphics:text id="AlertPullUP" x="397.706850" y="15.502353"
            dx="0.000000" dy="0.000000" encoding="UTF-8" text="Pullup" />
        </component>
      </graphics:group>
    </component>
  </base:switch>
  <connector id="fsmTosw" in="ascending/result" out="switch/state" />
</component>
```

PROCESSING UNIT, SOFTWARE AND METHOD FOR CONTROLLING INTERACTIVE COMPONENTS

FIELD OF THE INVENTION

The present invention relates to the development and execution of interactive software. More specifically, it relates to a processing unit, a software and a method for controlling the behavior of interactive components of an application.

BACKGROUND PRIOR ART

Interactive software refers to software that accepts inputs from humans, the physical environment or other machines, in addition to performing computations. Nearly all modern software is interactive software. For example, text editors, video games, internet browsers, smartphone applications, and the software of aircraft cockpit displays are interactive software. Computer operating systems, the firmware of connected objects, and web servers are also interactive software.

For many years specialized programming techniques have been used for graphical interactive software running on Personal Computers, wherein inputs were essentially performed using a mouse and a keyboard. Nowadays, the diffusion of new human input and output techniques, smartphones, tablets, network connections and connected objects has widely increased the number of possible combinations for designing interactive software. For example, on tablet computers, inputs can now be entered using a touch-sensitive surface, a connected object such as an air pointer, and internal sensors such as a gyro or an accelerometer. More complex interactive applications can be composed of multiple interactive software components running in a computer, in the firmware of a touch-sensitive tabletop display, in an internet server, and in multiple sensors across the world. It thus becomes necessary to provide programming techniques that encompass interactive software more widely.

Software components are collections of instructions that can be developed independently and assembled to produce software products.

The interoperability of software components is the ability of two or more software components to be interconnected and function properly together. Components are interoperable when there is a syntactically correct way to combine them without adding an adaptation layer, and when their semantics are directly compatible. Interoperability is a major concern in the development of software, because it dictates how software components can be reused and adapted across multiple applications, and when components can be interchanged during the process of designing an application. Interoperability is also a favorable condition for innovation, because it allows connection of components in ways not previously used. For example, driving the position of graphical objects on the display of a tablet with the orientation of the said tablet becomes possible when the accelerometer is made interoperable with graphics and interchangeable with the touch area. Interoperability and interchangeability can also be exploited during the execution of programs, producing connections that programmers do not need to describe explicitly and exhaustively. For instance, a game can be programmed to change randomly during a session which input device the user must use to control an object, or which transformation law is applied to the input.

Software architectures are sets of rules used to organize software components in smaller reusable components. Software architectures are concerned with how both software execution and data are organized, and they play a role in the interoperability and interchangeability of software components. A given software architecture is recursive when the same rules that are used to create any component can be used when reusing said component to create larger components. Recursivity helps to manage software complexity because programmers can choose to ignore the internal complexity of a component when assembling it with other components. Recursivity also facilitates interoperability and interchangeability between software components of different levels of granularity. For example, a graphical layout component that automatically computes the size and position of graphical components relies on recursive architectures so as to operate on all graphical components, whether simple like a rectangle or composed like a whole dialogue box. Recursive architectures are also needed if the same software function can be triggered by inputs with different levels of internal complexity, for example a simple keyboard key, a graphical button, and the output of a dialogue box.

Software architecture can be supported by programming conventions or by programming languages. For instance, object-oriented languages help to organize software in components that are both units of data and units of execution. Different architectures have been proposed for different types of software, according to how data and execution are more naturally organized in these types of software.

Traditional programming languages, such as C, C++, Lisp or Java, have been derived from programming languages focused on computation, by adding features that favor interoperability. For example, functional programming languages define functions as the foremost category of software component, and even treat data variables as functions with no arguments. This recursive architecture based on a single construct facilitates the creation of interoperable components in software where the role of each individual component is to implement a part of the computation of a global result. Similarly, by gathering computation and data in objects, object-oriented languages facilitate the interoperability of components in software where each individual component must store data in order to contribute to the global computation. Object-oriented languages also favor interoperability and reuse by supporting class inheritance. For more complex situations, Design Patterns have been proposed as additional methods for interconnecting software components whose relationships are incompletely described by function calls or inheritance relations.

Interactive software differs from computation-oriented software in several ways that impact software architecture.

In terms of execution, computation programs have a start and an end, and execution consists of steps and loops toward the end. In contrast, interactive software waits for inputs and triggers reactive behaviors or computations depending on the inputs received.

Interactive software also differs in terms of data management. Maintaining component state and data values is a central concern in interactive software, whereas it is often considered as a side effect in computation software.

Interactive software also exhibits a wider variety of how software components are combined. In computation-oriented software, the relation between a function and its arguments has been proved as a sufficient means of combination for most situations. Alternatively, imperative programming languages provide a few control structures (sequence, loops and tests) that can be used to interconnect programming instructions in computation programs. In interactive software, a large number of additional situations can be present. For instance, graphical components can be grouped in scene graphs, animations can be organized to be executed in parallel, graphical objects can be associated to the various states of dialogue components, instructions can be defined to be executed when an external event occurs, the visual properties of a graphical object can be defined to vary continuously with the values of data measured in the physical environment.

Traditional programming languages have received extensions to support the execution of interactive software. For example, waiting functions support execution control by external inputs, and threads support parallel execution of actions. With these extensions, they could in theory support the development of interactive software. However, the increase of possible inputs, states and combinations of components dramatically increases the number of possible executions of a given application. If this multiplicity of possible executions is programmed using the usual control structures, software complexity increases: any modification of the program behavior requires changes in multiple components, thus restraining the ability to make choices after the initial design phase.

Along with this increase in software complexity, the interoperability of software components tends to decrease, and software development and validation become long, costly and prone to errors. It also becomes difficult to analyze the properties of software at the appropriate level of abstraction, and only certain classes of interactive software can undergo the software certification processes required in some industrial fields. It also becomes difficult to design programming tools that facilitate software development, because there are no visual representations that appropriately capture the structure of software.

Various software patterns have been proposed to reduce the complexity of interactive software developed with traditional programming languages. Each pattern addresses one cause of complexity.

The most common software pattern is the callback function and its variants such as the Inversion of Control pattern and the Signal/Slot pattern, which are aimed at limiting the complexity induced by external control. In this pattern, a programmer can register a given function so that it is called when some conditions are met, such as the occurrence of a given type of external input. In some implementations of this pattern, the callback function is passed a data structure named "event" that contains the information about what caused the call.

Various software patterns have been proposed to curb software complexity by organizing software components according to their roles and defining how they can be combined. For example, with the Model-View-Controller pattern, application components are made of three sub-components that are respectively in charge of managing the data and the computation, visualizing the data, and managing user input. The Presentation-Abstraction-Control and Model-View-View Model patterns have similar structures. Extended scene graphs are another class of patterns, derived from graphical scene graphs, in which various kinds of non-graphical software components can be added as nodes of the graph, so as to align the software architecture of the application on its graphical structure.

Other patterns have been proposed to organize control flows in interactive software, and compensate for the limitations of control structures provided by programming languages. For example, Harel, D. Statecharts: *A visual formalism for complex systems*. Science of Computer Programming 8, 3 (June 1987), pp. 231-274 discloses Statecharts, hierarchical state machine components that can be combined to describe interactive systems. Myers, *A new model for handling input*, ACM Transactions on Information Systems, Volume 8 Issue 3, July 1990, pp 289-320 discloses a state machine component that can be adapted to program interaction in various kinds of software components. Transitions between states are performed at the occurrence of certain events, and the appearance and behavior of software depends on said state of software. Myers et al, *Garnet: Comprehensive Support for Graphical, Highly-Interactive User Interfaces*. 115 Computer, Vol. 23, No. 11, (November, 1990) discloses a one-way constraint system that propagates values between components in a data-flow fashion. Dragicevic et al. *Support for input adaptability in the ICon toolkit*. In Proc. ICMI'04, ACM Press (2004), pp. 212-219 discloses a data-flow system that can be used to program input management. Nigay et al, *A design space for multimodal interfaces: concurrent processing and data fusion*, Proceedings of INTERCHI'93, ACM (1993), pp 172-178 discloses a multimodal fusion pattern for combining events and states from multiple inputs. Calvary et al, COMET(s), A Software Architecture Style and an Interactors Toolkit for Plastic User Interfaces. In *Interactive Systems. Design, Specification, and Verification*, Lecture Notes In Computer Science, Vol. 5136. Springer-Verlag 2008), pp 225-237 discloses a pattern for managing the adaptation of software to changes in the computing platform and the execution context.

However, each of these solutions addresses only one cause of complexity, and in most interactive software they need to be combined to address all the causes. This constitutes a source of heterogeneity in the structure of software, because these patterns are not interoperable and components created with them are neither interoperable nor interchangeable. For example, value changes in a data-flow system cannot be directly used as an event in a callback system or a transition in a state machine. Adaptation code must be written to combine them, using the basic mechanisms provided by each programming language, and this introduces additional heterogeneity. This is unsatisfactory in terms of interoperability and introduces new complexity, with all the consequences described earlier.

Partial solutions have been proposed to make these software patterns interoperable. For example, Chatty. S *Extending a graphical toolkit for two-handled interaction*. In Proc. UIST'94, ACM (1994), pp. 195-204 discloses a method for combining state machines and data flows, in which the configuration of data flows changes when state changes. Jacob et al. A Software Model and Specification Language for Non-{WIMP} User Interfaces, ACM Transactions on Computer-Human Interaction, 6:1 (1999), pp 1-46, discloses a similar method. Appert et al. FlowStates: prototypage d'applications interactives avec des flots de données et des machines à états, Proceedings of the IHM 2009 conference, ACM publishing, pp. 119-128, discloses another method for combining state machines and data flows, using Java code to perform the adaptation. Elliott et al *Functional Reactive Animation*, Proceedings of the International Conference on Functional Programming (1997), pp 263-273; discloses Functional Reactive Programming, an alteration of the execution semantics of functional languages that allows exploiting the same syntax for expressing both traditional computation and data flows. Chatty et al. *Revisiting visual interface programming: Creating GUI tools for designers and programmers*. In Proc. UIST'04, ACM (2004), pp.

267-276 discloses an application of extended scene graphs for assembling graphics and heterogeneous behavior components in a homogeneous fashion. Prun et al, *Towards Support for Verification of Adaptative Systems with djnn*, The Seventh International Conference on Advanced Cognitive Technologies and Applications, pp 191-194 disclose similar solutions with a greater number of control structure patterns available, and a definition of interactive component that encourages programmers to exploit the benefits of the tree structure. But the components in the tree remain based on different mechanisms, and are limited in their possible combinations. For example, these solutions do not provide simple methods for combining reactive behaviors with computations, for interchanging a numeric variable with a state machine that has numerical states, of for refining state machines by adding conditions to transitions. The use of a traditional programming language is still required to express parts of the applications, and the execution model of components remains heavily dependent on the execution model of the underlying traditional programming language.

None of the above solutions guarantees that any software application can be created using a single set of homogeneous and interoperable components. In addition, most of these solutions are dedicated to graphical interactive software, and none are extensible enough to introduce new control structures as required by new interaction modalities and new interaction styles. All require the use in programs of instructions from a traditional programming language that provide missing control structures, architecture patterns, or even functionality, with all the consequences described earlier in terms of complexity, interoperability, reuse, certification, etc.

Dedicated languages have been proposed to program classes of interactive software using homogeneous components. For example, the XUL, XAML and QML languages propose recursive architectures for assembling graphical components in user interfaces. However, they cannot easily be extended to other uses than graphical user interfaces, they provide a limited range of control structures, and the applications and interactions that can be produced with them are stereotyped. Producing non-WIMP (windows, icons, menus, pointing) applications with them requires the use of a general-purpose language, and they cannot be used as general-purpose solutions for interactive software.

Synchronous data flow languages have been created to support the creation of interactive software such as automatic control systems. N. Halbwachs et al. *The Synchronous Data Flow Programming Language LUSTRE*. In Proc. I15 1991 Vol. 79, No. 9 discloses a synchronous dataflow language, LUSTRE. Extensions to LUSTRE have been developed to implement user interfaces. In LUSTRE inputs are used for controlling data flows. In addition, LUSTRE code can be used to define state machines. However, the interoperability between state machines and data flows in LUSTRE is limited as in previously described solutions. In addition, it is very difficult to replace one data flow with another, once it is defined. The definition of new control structures is not supported.

It is an object of the present invention to overcome these limitations of the prior art, by defining a recursive architecture for interactive software that ensures homogeneity, complexity management, interoperability and interchangeability of software components, supports computation and all usual control structures from interactive software, is extensible to all interaction modalities and interaction styles and supports the creation of new control structures as required by new uses of interactive software.

SUMMARY OF THE INVENTION

To this effect, the invention discloses an interactive component of an interactive digital system, said interactive component being configured to enable a defined interaction between the interactive digital system and an environment of the interactive digital system, said interactive component comprising a first subcomponent, wherein one of the interactive component and the first subcomponent defines a coupling between a second interactive component and a third interactive component; said one of the interactive component and the first subcomponent is configured, when executed by the interactive digital system, to generate an activation of the third interactive component conditional upon an activation of the second interactive component, said activation of the third interactive component conditional upon an activation of the second interactive component enabling the defined interaction.

Advantageously, the second interactive component is one of the interactive component, another subcomponent of the interactive component, a subcomponent of one of an application and an operating system of the interactive digital system and an interactive component being activated upon an input from the environment of the digital system.

Advantageously, the third interactive component is one of another subcomponent of the interactive component, a subcomponent of one of an application and an operating system of the interactive digital system and an interactive component producing an output to the environment of the digital system when activated.

Advantageously, the first subcomponent is executed by a processor onboard the digital system.

Advantageously, the interactive component being configured to produce the defined interaction results from successive iterations of: one of adding a subcomponent to the interactive component and replacing a subcomponent of the interactive component by another interactive component; checking if the interactive component produces the defined interaction.

Advantageously, the interactive component comprises a subcomponent representative of one of a variable and an arithmetic operation.

Advantageously, said interactive component is part of an application, and, one of the second interactive component and the third interactive component is part of another application.

The invention also discloses a method for executing an interactive component of an interactive digital system, said interactive component being configured to enable a defined interaction between the interactive digital system and an environment of the interactive digital system, said interactive component comprising a first interactive component, wherein one of the interactive component and the first subcomponent defines a coupling between a second interactive component and a third interactive component, said method comprising, when executing said one of the interactive component and the first subcomponent, generating an activation of the third interactive component conditional upon an activation of the second interactive component, said activation of the third interactive component conditional upon an activation of the second interactive component enabling the defined interaction.

The invention also discloses a computer program, stored on a non-transitory computer-readable medium, configured for executing an interactive component of an interactive digital system, said interactive component being configured to enable a defined interaction between the interactive digital system and an environment of the interactive digital system, said interactive component comprising a first subcomponent, wherein one of the interactive component and the first subcomponent defines a coupling between a second interactive component and a third interactive component, wherein said computer program comprises code instructions for, when executing said one of the interactive component and the first subcomponent, generating an activation of the third interactive component conditional upon an activation of the second interactive component, said activation of the third interactive component conditional upon an activation of the second interactive component enabling the defined interaction The invention also discloses a processor of an interactive digital system, said processor being configured for executing an interactive component of said interactive digital system, said interactive component being configured to enable a defined interaction between the interactive digital system and an environment of the interactive digital system, said interactive component comprising a first subcomponent, wherein one of the interactive component and the first subcomponent defines a coupling between a second interactive component and a third interactive component, and said processor is configured for, when executing said one of the interactive component and the first subcomponent, generating an activation of the third interactive component conditional upon an activation of the second interactive component, said activation of the third interactive component conditional upon an activation of the second interactive component enabling the defined interaction.

The invention also discloses a method for producing an interactive component of an interactive digital system, said interactive component being configured to enable a defined interaction between the interactive digital system and an environment of the interactive digital system, said method comprising adding to the interactive component a first subcomponent, wherein one of the interactive component and the first subcomponent defines a coupling between a second interactive component and a third interactive component, and said one of the interactive component and the first subcomponent is configured, when executed by the interactive digital system, to generate an activation of the third interactive component conditional upon an activation of the second interactive component, said activation of the third interactive component conditional upon an activation of the second interactive component enabling the defined interaction.

The invention eases the development of interactive applications.

The invention permits the definition of operations and control structures of an application under a single primitive.

The invention permits the development of applications whose components are interchangeable.

The invention eases the management of inputs and interactions of applications.

BRIEF DESCRIPTION OF THE DRAWINGS

The invention will be better understood and its various features and advantages will emerge from the following description of a number of exemplary embodiments and its appended figures in which:

FIG. 2 displays a component comprising a tree of subcomponents in a number of embodiments of the invention;

FIG. 18 displays an XML representation of components that display alarms in a Primary Flight Display in an embodiment of the invention;

DETAILED DESCRIPTION OF THE INVENTION

Figure 1:
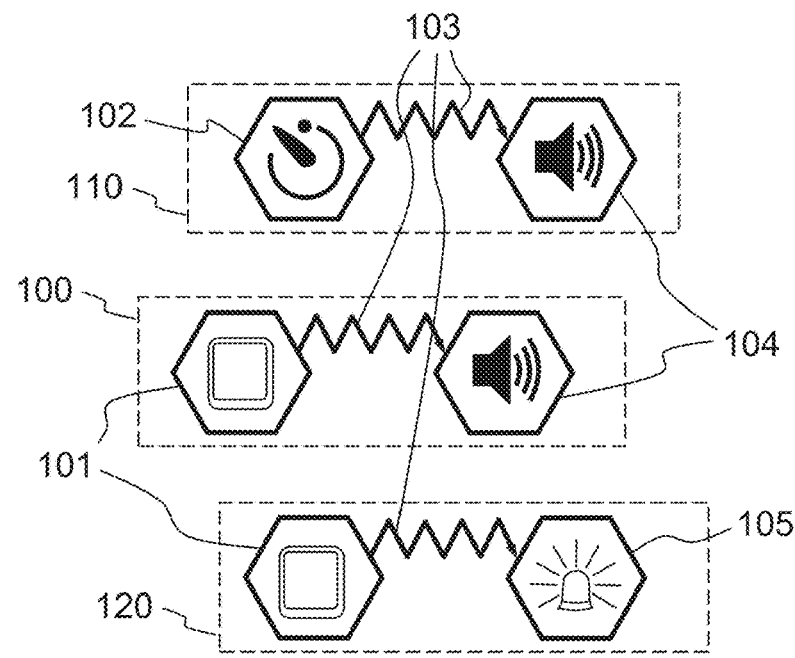
FIG. 1 displays three examples of couplings in a number of embodiments of the invention, respectively between a key and a beeper, a timer and a beeper, and a timer and a LED.

In this specification, the invention will be described by way of examples relative to interactive components executed by an interpreter or programming framework, said interpreter and programming framework being described with references to FIGS. 10 and 12. The naming of the component types refers to their name in the djnn framework.

The djnn framework, available at http://djnn.net/, is a programming framework developed by the applicant for designing interactive applications, in which components are created using templates defined in component types. However, the invention is applicable to other platforms and products, and a skilled person can easily define component types with new functionalities or names and other ways of creating components while remaining under the scope of the invention. The component types and implementations described in this specification are provided as non limitative examples only, and do not limit in any way the scope of the invention, which is defined in the appended claims.

According to the invention, any software component can be produced as a collection of interactive components, and its execution defined as the controlled activation of said interactive components. For example, without limitation, the following entities can be represented as interactive components: a constant value, a memory variable, a data structure, a memory assignment instruction, an addition instruction, a sequence of instructions, an iteration loop, a function or procedure, a computation algorithm, a graphical object, a dialogue box, a gesture recognition system, the software proxy of a mouse input device, the software proxy of a button of a mouse input device, an application.

In this specification and in the figures, the name "component" is construed as a synonym for "interactive component", and except when stated otherwise references to a physical entity or to any element of the environment of the software will be meant as references to their software proxy, a software proxy being an interactive component whose behavior reflects the behavior of said physical entity or element of the environment. The environment of the software is any measurable phenomenon that is accessible to the software, including but not limited to hardware devices, sensor-measured environment, and other programs.

Components of an interactive application according to the invention can be in an active or inactive state. Some components can be activated and deactivated. The operations performed upon the activation of a component depend on said component. For example, a computation algorithm performs its computation when it is activated, a graphical object is displayed when it is activated, and a beeper produces sound for a limited time when it is activated.

Some components, when activated, return automatically to an inactive state. For example, an arithmetic operation is active very briefly and returns to an inactive state immediately; a function or an animation is active while it is running and it returns to an inactive state when it terminates. Other components, when activated, stay active until they are deactivated. For example, a graphical object is invisible when inactive, becomes visible when it is activated, and stays active and visible until it is deactivated. Some components are always active. For example, in many embodiments of the invention, memory slots are always active. Similarly, software proxies of some physical entities are always active when they are present, for example in many embodiments of the invention a mouse is always active when it is plugged on the computer.

The activation of a component can be controlled by its interactions with other components or with the environment of the software. Reciprocally, the activation of a component can control its interactions with the environment of the software and with other components. According to the invention, these two reciprocal situations of control are represented by couplings between pairs of components and by couplings between a component and the environment of the software. Couplings represent the causality between activations.

When a coupling exists between a first component and a second component, the activation of the first component triggers the activation of the second component. The first component is called the source of the coupling, and the second component is called the action of the coupling. For example, when the software proxy of the key of a keyboard is coupled to a beeper, every activation of said software proxy triggers the activation of the beeper. Similarly, a function call from a traditional programming language can be reproduced according to the invention as the activation of a function made possible thanks to a coupling between the caller and said function.

When a coupling exists between the environment of the software and a component, some changes of conditions in the environment of the software can trigger the activation of said component. For example, a mouse button is activated when the user presses it, a program is activated when the user or the operating system runs it, and a temperature sensor can be defined so that said temperature sensor is activated when the external temperature crosses a defined threshold.

When a coupling exists between a component and the environment of the software, the activation of said component can trigger changes in the environment of the software. For example, the activation of a graphical object makes said graphical object to appear on a display, the activation of a "stimulation" component produces electrical stimuli in an electrode connected to the nervous system of an animal.

FIG. 1 displays three examples of couplings in a number of embodiments of the invention, respectively between a key and a beeper, a timer and a beeper, and a timer and a LED. The component 101 is the software proxy of a key, the component 104 is the software proxy of a beeper, and the component 105 is the software proxy of a blinking animation of the LED. In 100 a coupling 103 is defined between the key 101 and the beeper 104. When the physical key of the keyboard is pressed, the key component 101 is activated and through the coupling it activates the beeper component 104, which in turn activates the physical sound production device.

Couplings can exist between any two components. This enforces the interoperability and interchangeability of components. For instance, in 110 the key 101 was replaced by the "timer" component 102 in the coupling to the beeper 104. In this configuration the beeper 104 is activated when the delay defined in the timer 102 is expired. In 120, the beeper 104 was replaced by the blinking animation 105 in the coupling with the key 101. In this configuration the blinking starts when the key 101 is pressed. These examples demonstrate the interchangeability of the components in the invention, and the diversity of effects that can be produced even in simple embodiments of the invention.

A component can be structured as a collection of sub-components. A component interacts with its environment through the couplings and activations of itself and of its sub-components. The environment of a component comprises the other components and the environment of the software. For example, the software proxy of a mouse interacts with other components through the couplings activations of its buttons and position tracker, said buttons and position trackers being sub-components of said mouse. Similarly, a memory slot interacts with its environment through the couplings and activations of its sub-components that represent its read and write abilities. Similarly, a graphical object interacts with its environment through the couplings and activations of the sub-components that represent the read and write abilities of the memory slots that represent the position of said graphical objects.

In a number of embodiments of the invention, the sub-components of a component can be organized hierarchically in a tree. FIG. 2 displays a component comprising a tree of sub-components. The tree 200 comprises a component 201 and sub-components 202, 203, 204, 205, 206. The sub-components of a component are all the direct sub-components of a component in the tree, the tree being defined by successive levels of sub-components. This is illustrated in 210 where components 205 and 206 are shown to be direct sub-components of component 204. The visual representation used in 210 is often used in this specification for representing sub-components of a component.

The tree structure advantageously reflects the natural perception that programmers have of how software and hardware devices are organized. For example, a graphical button can be a sub-component of a dialogue box, a mouse button is a sub-component of a mouse, and the position of a graphical object is a sub-component of said graphical object.

The tree structure also provides a natural way of naming and accessing the sub-components of a component, using a path syntax. In some embodiments of the invention, direct sub-components of a component can optionally be given names relative to said component, and components can optionally be given names as roots of component trees. In FIG. 2, component 201 is given the name "a" as the root of a tree, and components 202, 203 and 204 are respectively given names "b", "c", and "d" as sub-components of component 201. This allows to designate component 202 as "/a/b" in a general context, or as "b" in a context where the name is understood to be relative to component 201. Similarly, component 206 can be known as "f" in a context relative to component 204, "d/f" in a context relative to component 201, or "/a/d/f" in a general context. Names such as "a/d/f" are known as "paths", and individual names in paths are known as path segments.

The tree structure also allows to define and represent components using the XML notation. In 220, component 201 is represented in XML notation taking advantage of the ability of the XML notation to represent trees. In 220 and in all XML representations used in this specification, the XML tag that represents a component is written using the name of the type of said component, and the "id" attribute is used to display the name of each component in the tree. For instance, component 201 is of type A its name is "a", consequently it is represented as <A id="a">. In the XML representation of components, it is possible to omit sub-components of a component when the internal structure of said component is always the same for all components of the same type. For instance, if components of type D always contain two subcomponents of type E and F respectively named "e" and "f", then it is not necessary to include said sub-components in the XML representation of said components of type D. In 230 is a representation of component 201 wherein the structure of component 204 is not revealed, whereas in 220 said structure is revealed.

The tree structure also advantageously permits to replace a subcomponent by another, thus permitting further interoperability and interchangeability of components. For example, if the subcomponent 202 is a button, it can be replaced by another button by simply replacing the subcomponent by another. Similarly, if the subcomponent 206 is a function or operation that is performed upon pressing the button 202, it can be replaced by another subcomponent that will perform another function or operation. Each possible input, output or operation can be represented as a component. This property permits a complete interchangeability between components.

In some embodiments of the invention, the software proxies of elements of the environment can be organized as a tree of components that has its root outside the tree of any application. This allows to mutualize software proxies between applications, and to represent the fact that the actual devices or elements of the environment have an independent existence.

In some embodiments of the invention, it is possible when defining a component to control the access to its sub-component so as to hide some details of said component. It is also possible to make a sub-component of a component accessible under another name, with the purpose of making the reuse of said component easier. For example, the "/mouse/move/x" sub-component might be accessible as "/mouse/x".

In some embodiments of the invention, other structures than the tree structure can be defined as an alternative or a complement to the tree structure to organize the sub-components of a component. For example, all the sub-components contained in a component can be organized as a relational database of sub-components. This advantageously allows optimizing how sub-components are stored and managed according to performance constraints for example. This also allows querying the component for its sub-components through a query language rather than recursively querying sub-components for their own sub-components based on a path syntax.

In a number of embodiments of the invention are defined a set of primitive components. The activation of any primitive component represents the execution of a primitive operation defined by the environment of execution of the component, for example the underlying hardware platform, the software execution platform or the primitive signal detections provided by said platform. For example, memory slots and the input and output devices are primitive components in the djnn framework, relying on the memory reading and writing operations available on computing platforms. Another embodiment of the invention may define text labels and text input fields as primitive components if said embodiment is specialized for creating forms.

In a number of embodiments of the invention, non-primitive components can be defined. The activation of any component that is not a primitive component is equivalent to the activation of a sub-component of said component named START, and the deactivation of said component is equivalent to the activation of its sub-component named STOP. This convention enforces the recursive nature of the architecture of components while allowing vendors to select how the component architecture is grounded on a given execution platform. However other means for defining non-primitive components may emerge and be defined by a skilled man without requiring an inventive step.

In a number of embodiments of the invention, the activation of a component may depend on its activation context. An activation context is a collection of references to other components. Said other components are called elements of the activation context of said component. The sub-components of a component can be elements of the activation context of said component. For example, a beeper that produces a sound when activated can find the frequency of said sound in one of its sub-components. Similarly, some components may find elements of their activation context in any component of which they are a sub-component, or in sub-components of said component. For example, an alternative realization of a beeper component can rely on being a sub-component of a component, said component also containing a sub-component that gives the sound frequency. Alternatively, when a coupling activates its action component, said coupling makes its source and the activation context of said source available as elements of the activation context of said action component. For example, another realization of a beeper component can be programmed to find the sound frequency in the source that triggered its activation. Alternatively, elements of the activation context of a component can be provided by the execution platform. For example, the execution platform can maintain a sound frequency that is used by all beeper components when they are activated, and other types of components may modify said frequency. Similarly, the execution platform can maintain a drawing color that is used by graphical objects when they are activated, and color components can modify said drawing color.

Given an execution platform, primitive components can be defined so as to allow the realization of any conceivable computer program for said execution platform as a collection of said components. Available components may vary according to the various embodiments and implementations of the invention, and may belong to the following informal, non-limitative and non-exclusive categories:

container components, which allow to organize components in collections of sub-components;
 control structure components, which control the activation of other components;
 memory components, that permit interpreting, reading and writing the memory of a computer or device;
 input and output components, which define the inputs and outputs of the application;
 operation components, which perform operations defined by the underlying computing platform, for example arithmetic operations;
 programmer-defined components, that are obtained by combining components from any category, including other programmer-defined components.

This specification provides exemplary components from all categories, in a number sufficient that a skilled man can use these components or derive new components from them in order to produce all current types of interactive software, as well as to rename them or modify their behavior. A skilled person may also be able to define new categories according to present or future capabilities of execution platforms. However, the examples provided in this specification demonstrate the ability of interactive components according to the invention to encompass the widest possible range of applications.

All said components are defined by combining couplings with software proxies of operations or mechanisms provided by the computing platform and its peripherals. Said components can themselves be combined through the use of couplings. This universal use of a unique mechanism for assembling and controlling interactive components provides all the benefits of a fully recursive software architecture: homogeneity, complexity management, interoperability and interchangeability.

The blank component is a simple container component that is used to assemble any sub-components as desired. By default, the blank component is not coupled to its sub-components and its activation has no effect. In some embodiments of the invention, it is possible to change this default activation with another one. This change can be performed by adding to the blank component a sub-component whose activation has the desired effect and by specifying that said sub-component must replace the default START sub-component of said blank component.

Figure 3:
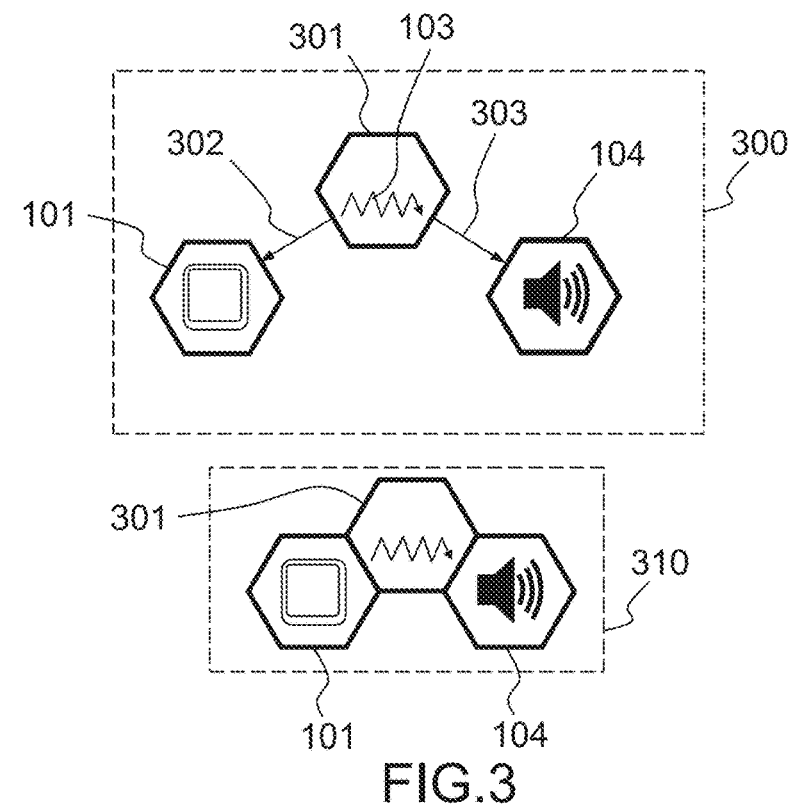
FIG. 3 displays an example of a coupling created by a control structure component called binding in an embodiment of the invention.

FIG. 3 displays an example of a coupling created by a control structure component called binding in an embodiment of the invention.

Components whose activation can create couplings between two other components are named control structures.

The binding component is a simple control structure. A binding is defined with a reference to a first component named its source and a reference to a second component named its action. When it is activated, a binding creates a coupling between the source or a sub-component of the source and the action or a sub-component of the action. When it is deactivated, said binding destroys the coupling. FIG. 3 displays in 300 a binding 301 that has the key 101 as its source as denoted by the reference arrow 302, and the beeper 104 as its action as denoted by the reference arrow 303. Binding 301 creates coupling 103 between the key 101 and the beeper 104 when it is activated, producing the configuration shown as 100 in FIG. 1.

The representation 310 is a more condensed representation of the representation 300 where the arrows 302 and 303 have been omitted. The convention of juxtaposing components is used in other figures of this specification to represent references such as source and action, or input and output.

Figure 4:
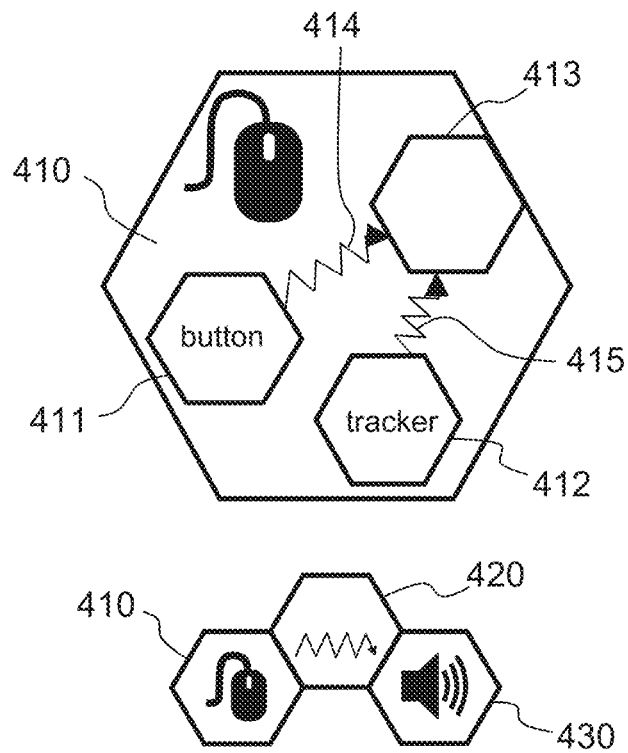
FIG. 4 displays an example of binding between a mouse and a beeper in an embodiment of the invention.

FIG. 4 displays an example of binding between a mouse and a beeper in an embodiment of the invention.

In a number of embodiments of the invention, when a binding is created between a source component and an action component, the source of the coupling can be a sub-component of the source component rather than the source component itself, said sub-component being chosen by said source component Similarly, the action of the binding can be a subcomponent of the action component rather than the action component itself, said sub-component being chosen by said action component. FIG. 4 displays a binding 420 whose source is a mouse component 410 and whose action is a beeper 430. The mouse 410 is made of sub-components button 411, position tracker 412 and component 413 such that 413 is the action in a coupling 414 to button 411 and also the action in a coupling 415 to position tracker 412. Mouse 410 is defined so that, when it is used as the source of a binding, activation of said binding creates a coupling whose source is the component 413.

Consequently, any movement of the mouse 410 detected by the position tracker 412 or any use of button 411 triggers the activation of beeper 410. This indirection mechanism for defining the source and the action of a coupling from the source and the action of a binding advantageously supports situations in which it is desirable to view the behavior of a system as reduced to the behavior of one of its parts. In the experience of the applicant, it is particularly useful with components that are always active, and for which it is nevertheless useful to reason on a secondary concept of activation. For example a connected input device is always active as a component because it always plays its role as a sensor, but when reasoning on its manipulation by a user as a secondary concept of activation. However, it is possible to define binding components without this indirection mechanism while staying in the scope of the invention.

Despite its simplicity, the binding component, in combination with memory, operations, input and output components, can express the full range of behaviors of an interactive application. Numerous other control structures components in this specification, although being more complex and permitting to define complex behaviors of an application easily, are based on a combination of bindings and non-control structure components.

Figure 5:
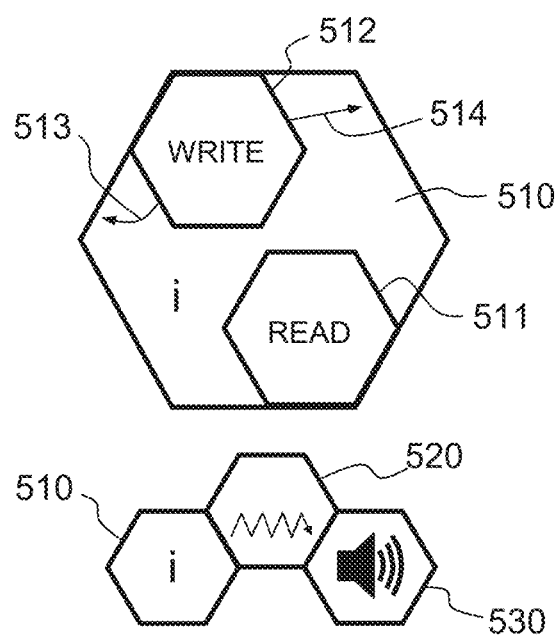
FIG. 5 displays a binding having a property as its source in an embodiment of the invention.

FIG. 5 displays a binding having a property as its source in an embodiment of the invention.

A property is a component that represents an area in memory and an encoding format for storing and retrieving information in said memory. For example, in a number of embodiments of the invention there are Boolean properties, integer properties, floating point properties and text properties. In many embodiments of the invention, properties are always active. In a number of embodiments of the invention, a property has sub-components READ and WRITE which are only used directly in assignment components, and sub-component WRITE is defined as the sub-component that is coupled when said property is used as the source of a binding or a similar control structure. In these embodiments, creating a binding between a property and an action ensures that the action is activated when the property is written to. Thus, any value that depends of a value of said memory can be activated and updated through the coupling every time the memory is written into. In the exemplary embodiment displayed by FIG. 5 the property 510 named "l" has a subcomponent READ 511 and a subcomponent WRITE 512. The arrow 513 represents the fact that the sub-component WRITE 512 uses a reference to a component named its source, and that it accepts said source as an element of its activation context. The source of sub-component WRITE 512 is a reference to a component from which the value written to the memory in property 510 is read. The arrow 514 represents the fact that the sub-component WRITE 512 is defined as the sub-component that is coupled when the property 510 is used as the source of a binding. A beeper 530 emits a sound every time it is activated. A binding 520 has the property 510 as its source and the beeper 530 as its action. When active, the binding 520 creates a coupling whose source is the subcomponent WRITE and whose action is the beeper component 530. Consequently, beeper 530 is activated each time the property 510 is written to.

Blank components can be used to assemble property components in order to create more complex property components. For example, a geometrical point property can be created by assembling two numerical properties, and a geometrical rectangle property can be created by assembling two geometrical points. The value of combined properties is defined as the combination of the values of individual properties.

Figure 6:
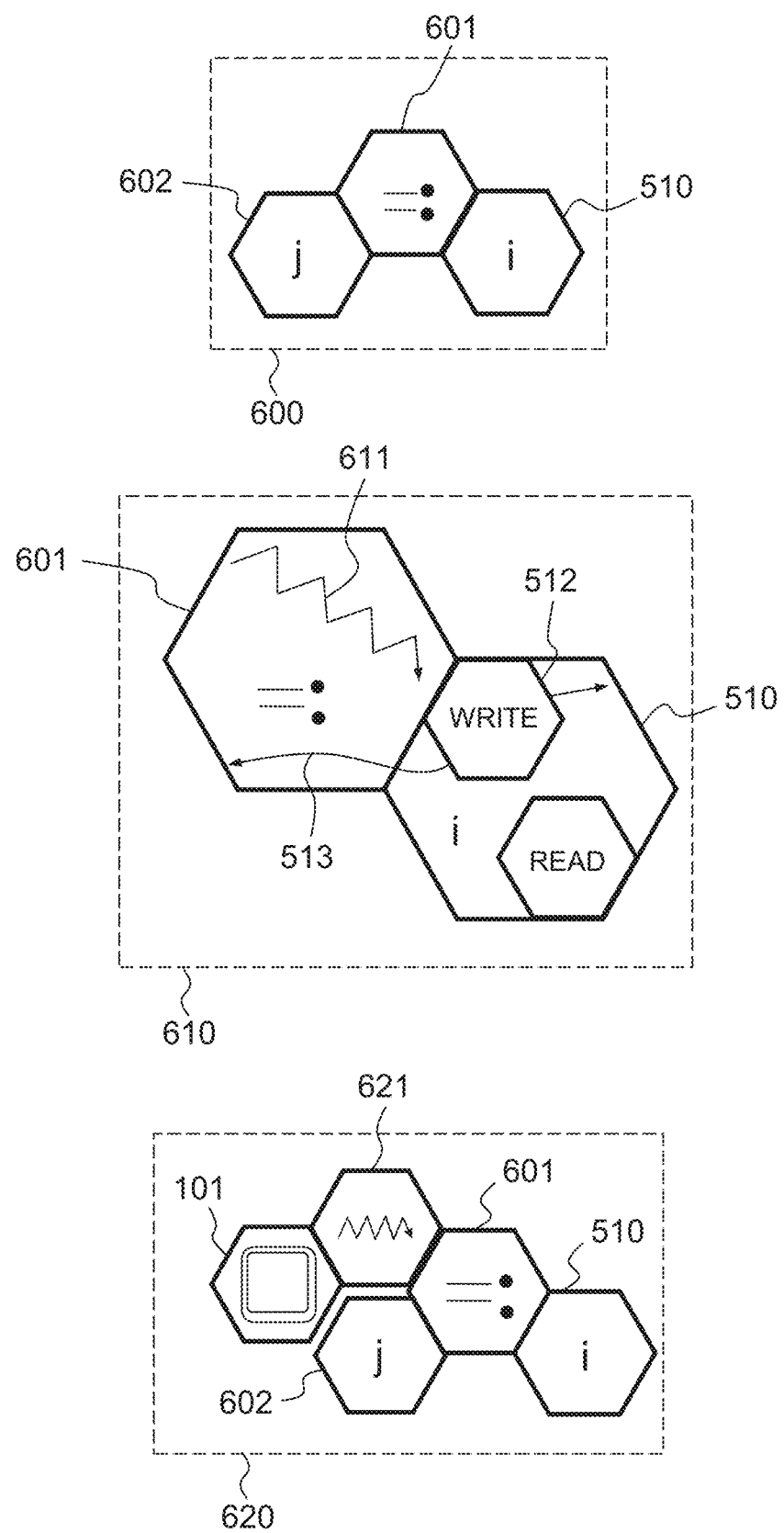
FIG. 6 displays three examples of a control structure component called assignment in a number of embodiments of the invention.

FIG. 6 displays three examples of a control structure component called assignment in a number of embodiments of the invention.

An assignment component is an operation component, defined with a reference to a first component named its source and a reference to a second component named its destination. When it is activated, an assignment copies the value of the first component to the second component if the two components are compatible. The configuration 600 comprises an assignment 601 that has a property 602 named "j" as its source and the property 510 named "i" as its destination. When the assignment 601 is activated the value of property 602 is copied to property 510.

The configuration 610 demonstrates how assignment 601 can be produced in some embodiments of the invention as a component that creates a coupling 611 between itself and the WRITE sub-component 512 of property 510, and that ensures as shown by arrow 513 that the source reference of WRITE subcomponent 512 is the same as its own source reference.

Configuration 620 displays an example wherein the copy of properties is triggered by pressing a button. The binding 621 has the key 101 as its source and the assignment 601 as its action. Thus, upon a press of key 101, the assignment 601 is activated, and the value of the source property 602 is copied into the destination property 510.

Figure 7:
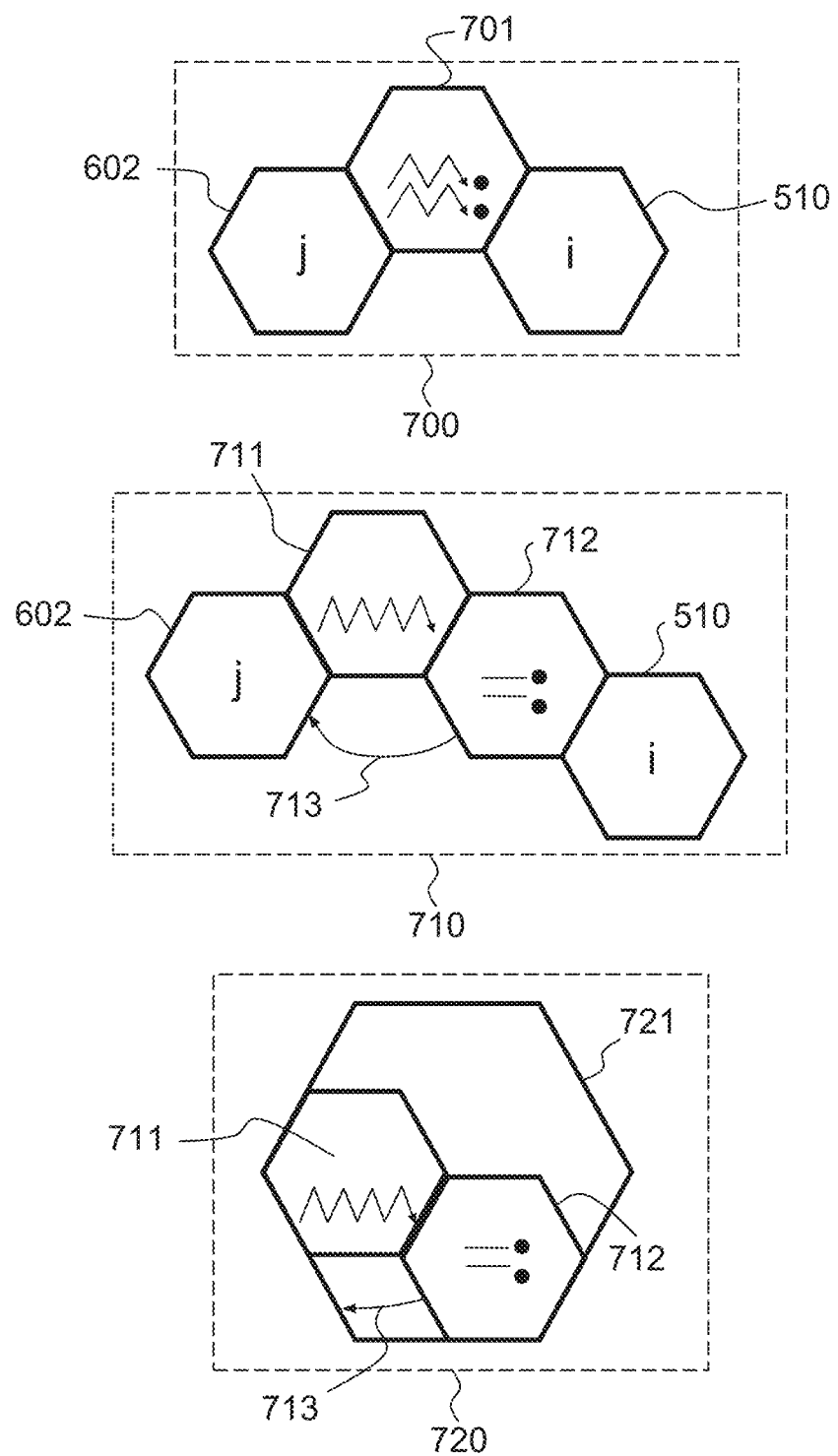
FIG. 7 displays an example of a control structure component called connector in a number of embodiments of the invention.

FIG. 7 displays an example of a control structure component called connector in a number of embodiments of the invention.

A connector is a control structure that is equivalent to the composition of a binding and an assignment. A connector is defined with a reference to a first component named its input and a second component named its output. When it is activated, a connector couples the modifications of its input to its output. The configuration 700 displays a connector 701 that has property 602 as its input and property 510 as its output. According to this configuration 700, property 510 receives the value of property 602 every time property 602 receives a new value. The connector component provides support for data-flow architecture patterns while staying interoperable with any component and interchangeable with the other control structures, for example the binding component, because it is constructed using the same types of constituents.

The configuration 710 of components is equivalent to the configuration 700, where the connector 701 has been replaced with a binding 711 and an assignment 712. The arrow 713 represents the source reference of the assignment 712, said source reference pointing to property 602.

The configuration 720 displays a connector created in an embodiment of the invention by assembling a binding sub-component 711 and an assignment sub-component 712 within a blank component 721. The arrow 713 shows that the source reference of the assignment component 712 is defined as being the same as the input reference of the connector component. Similarly to the behavior of configuration 710, any modification of the component referred to by the input reference activates the assignment 712 which copies the value of said component to the component referred to by the output reference.

In a number of embodiments of the invention, arithmetic and logic operations are performed by arithmetic and logic components. Arithmetic and logic components are operation components which can be defined using the same principles as the assignment component. A component that represents a unitary operation, for example the logical negation, or the sign changing operation, can have a reference to a numerical or logical property named its operand and a reference to another numerical or logical property named its result. A component that represents a binary operation, for example the logical OR or the addition, can be defined with a reference to two numerical or logical properties named its left and right operands and a reference to another numerical or logical property named its result. When activated, the operation is performed on the values of the operands and the resulting value is written to the result. Arithmetic and logic operations comprise classical arithmetic operations, logic operations, numerical comparisons and text comparisons. The same principle can be extended to any mathematical operation or function, which a skilled man can define with parameters and results in an embodiment of the invention.

Other arithmetic and logic components can be defined to represent operations that modify one of their operands. For example, the increment component is defined with a reference to a numerical property, and its activation increments the value of said numerical property. A list of operand-changing components can easily be deduces from those available in traditional programming languages.

Control structure components can also be defined to control the order in which multiplicities of components are activated. The paragraphs below describe some more complex control structure components that demonstrate how the interactive components of the invention can be used for defining complex behaviors.

For example, a serialization component can be defined with references to a first and a second component, and ensure that the second component is activated only when the first component returns to the inactive state. The serialization component is equivalent to a binding between the STOP sub-component of the first component and the second component.

In a number of embodiments of the invention, a sequence component defines an order in which a plurality of components is executed one by one. The sequence component is a control structure component that can be defined as a container component with a plurality of subcomponent for in which an order is specified. A sequence component can be created for example if the activation of said sequence triggers the activation of the first sub-component, and by creating, for each of the sub-component of said sequence, a coupling between the STOP sub-component of said sub-component and the next sub-component of said sequence. Thus, when each component of the sequence switches to an inactive state at the end of its execution, its STOP sub-component is activated, which activates the next sub-component, etc. until the end of the sequence.

In a number of embodiments of the invention, a loop component is a control structure component defined with a Boolean property called its condition and a reference to a component called its body. When a loop component is activated, it repeatedly activates its body and waits for the deactivation of said body as long as the value of the condition of said loop component is true.

In a number of embodiments of the invention, a parallel component is a control structure component that can be defined as a container component in which no order is specified for sub-components, the activation of said parallel component triggers the activation of all its sub-components, and no assumption can be made on the order of said activations of sub-components.

In a number of embodiments of the invention, a synchronization component can be defined with references to a multiplicity of components named its sources, a reference to a component named its action, and a reference to a component named its initial cause. The activation of said synchronization component is defined so that any non-null number of activations of any said sources triggered by the same activation of said initial cause will trigger one and only one activation of said action. The synchronization component provides a useful tool for controlling the execution of software in complex environments, for example for programming data flows.

In a number of embodiments of the invention, the binding components can be extended so as to support the coupling of components that do not reside in the same program, so as to control the distributed interaction between programs.

The combination of mathematical operation components defined earlier with control structure components can be used to define components that represent mathematical operations in a fashion that is more suitable for creating interactive software, using the principles that were used for creating the connector component with a binding and an assignment.

In a number of embodiments of the invention, a binary adder component can be defined by assembling an addition component and three properties named left operand, right operand and result, by coupling the two operands to said addition component, and by making the left operand, right operand, and result references of said addition component point to respectively said left operand property, right operand property, and result property. Thus, any modification of one of the left property and right property activates said left or right property. The coupling between said one of left and right property and the addition activates this addition, and the left and right properties are summed into the result property.

In a number of embodiments of the invention, a counter component can be defined with a numerical property and an increment component. Similar components can be defined for all numerical, logical operations.

In some embodiments of the invention, the two couplings between the operands and the addition in adder components may also be replaced with a more complex configuration of couplings and memory slots. For example, the operands of the addition may be coupled by a component equivalent to the synchronization component, in order to ensure that the addition is activated only once even when the two operands have changed because of the same initial cause.

Counter components, binary adder components and similar computation components can be used in conjunction with connectors to create data flows in which any change in the inputs produces a new computation. Such data flows can be used for example to realize animated trajectories for graphical objects as explained below.

Output components can be defined, which are components coupled to the physical or software environment of the application, or whose sub-components are coupled to said environment. The activation of said output component or sub-components of said output component triggers changes in said environment, for example updates the display of a device.

Graphical object components can be defined as output components that represent the 2D contents of a graphical display. Graphical object components are coupled to actual physical displays through a series of software and hardware mechanisms provided by the computer and its peripherals. This collection of couplings is called the rendering engine of the graphical object components.

Graphical shapes can be defined as graphical components that produce shapes on graphical displays when they are in their active state. Graphical shapes are defined to contain properties that control their effect. For example, a graphical rectangle contains one X, one Y, one WIDTH and one HEIGHT numerical properties. The rendering engine ensures changes to the activation status of said graphical rectangle or to the value of said properties trigger changes in the contents of the physical graphical display.

Graphical groups are graphical components that can contain other graphical components. Graphical shapes are naturally expressed in a tree structure. For example a group component may have as sub-components all rectangle and text shape components that are needed to represent a button and its label. In a number of embodiments of the invention, the order of graphical shapes in a graphical group or in any other order-enforcing container component determines their superposition order on the graphical display.

In a number of embodiments of the invention, graphical styles are graphical components that control for example the color, width, or texture of graphical shapes. Graphical styles are defined to contain properties that control their effect. For instance, a color component contains one R, one G and one B numerical properties, and the rendering engine ensures that any change to the activation status of said color or to the value of said properties triggers changes in the contents of the physical display In a number of embodiments of the invention, the components affected by a graphical style or a change of a graphical style are determined from the position of said graphical style relative to other graphical components in a graphical group or in an order-enforcing container component. For example, it can be defined that a graphical style affects all graphical shapes which are in the order interval that starts at said graphical style and finishes at any graphical style of the same type.

In a number of embodiments of the invention, graphical transformations are graphical components that control geometrical transformations applied to graphical shapes. For example, a scale transformation component changes the size of the shape components that are affected by it. Like graphical styles, graphical transformations have properties that control their effect, changes of activation status of said graphical transformation or values of said properties trigger changes in the contents of the physical display, and the list of shapes that are affected by graphical transformations is defined by the order of graphical objects in a order-enforcing container components.

In some embodiments of the invention, other components can be defined to interact with a physical display. Said other components can be defined according to any set of drawing primitives known in the literature. For example, a graphical object component can be defined as the combination of a shape, a style and a transformation. Alternatively, 3D graphical objects can be defined. Alternatively, drawing operation components can be defined such that the activation of one of said drawing operation components executes a drawing operation on the graphical display, and maintaining graphics on a display can only be obtained through repeated activation of said drawing operation component, Other output components can be defined for any output interaction modality, for example components for emitting sounds, for controlling lights, and for controlling any electronic apparatus. Also, output components can be defined for any mechanism through which a computer can operate on its environment, or otherwise any mechanism through which a software application can operate on its software environment, for example the ability to stop other applications running on the same computer.

An input component is a component to which the physical or software environment of the application is coupled, or to the sub-components of which said environment is coupled, such that changes in said environment triggers the activation of said input component or of sub-components of said input component.

Input components can be defined for any input device. For example, a keyboard component can be defined as a collection of key sub-components, each key representing a physical key of a physical keyboard. Physical actions on the physical keys are coupled to the activation of sub-components of the keys. Similarly, a mouse input device can be represented as a mouse component made of a sub-component for each button, and a position tracker sub-component that is activated upon each change of the position of the physical mouse. What input components are available on a given computer depends on the physical configuration of said computer.

Input components can also be defined to represent objects or phenomena detected by sensors that are connected to the computer. For example, the clock component is a component that uses the functions of the computer to detect the passing of time, and that is activated at the end of every interval of time of a determined duration. Also, input components can be defined to represent a sensor that measures the energy level of a computer battery, a sensor that measures the ambient light, and a sensor that detects the presence of persons in a room.

The detection of a new object and the loss of detection of an object by a sensor can be represented respectively as the addition of a component representing said object to a set component and as the removal of said component from said set component, set components being described below. For example, if a sensor measures the movements of multiple fingers on a touch-sensitive surface, then each contact of a finger can be represented as a sub-component of the set that represents said touch-sensitive surface, the position of said contact being represented as the position property of said sub-component.

In various interactive applications, the inputs from the user or the environment are interpreted according to the contents and state of the application so as to produced context-enriched input. For example, when a pointing device such as a mouse, a stylus or a touch screen is used in conjunction with a graphical display, an algorithm is applied to compute which graphical object is under the cursor of said pointing device. The resulting pair (position, graphical object) can be viewed as a context-enriched input. This can be represented in various ways. For instance, in some embodiments of the invention, dedicated input components are defined to represent said context-enriched inputs. For example, an input component can be defined with a position property and a reference property to represent the combination of a pointing device and a graphical display. In some embodiments of the invention, this is represented by the addition of new sub-components to existing components. For example, graphical shapes can receive three new sub-components named "press", "release", and "move" that are activated when respectively the "press", "release", and "move" sub-components of the pointing device is activated while the position of the pointing device is inside the space occupied by the shape on the graphical display. Similarly, "enter" and "leave" subcomponents can be added to graphical shapes to represent the cases when the position of the pointer enters or leaves the space occupied by the shape.

An input/output component is a component defined as being both an input component and an output component, for example for a peripheral that accept both inputs and outputs. For example, a joystick with force feedback is an input component and an output component. Components that represent the communication devices through which a computer communicates with other computers can also be defined as input/output components. Input/output components can easily be created by using in the same component the techniques for creating input components and the techniques for creating output components.

The examples above demonstrate the ability of interactive components according to the invention to define the inputs and outputs available on a given platform. The concepts presented can be easily extended to new hardware, input and output peripherals, or platforms.

Interactive software can be obtained by creating couplings between input and output components. Said couplings can be obtained by assembling components. The nature of said components determines the behavior of the interactive software. For example, bindings can be created with input components as their source and output components as their actions. More complex behaviors are obtained by assembling bindings, properties and operations then coupling them to input and to output components. Alternatively, chains of connectors and operators such as counters and adders can be created so as to produce data flows between input and output components. For example, creating and activating a connector whose input is the position of a pointer and whose output is the position of a rectangle ensures that the position of the rectangle will be driven by the position of the mouse. As another example, creating a binding between a clock and a counter, then a collection of connectors and numerical operators that are connected to said counter and that compute the position of a point on a trajectory, then connecting the resulting output to the position of a graphical object results in the graphical object being animated on a trajectory.

Additional control structures can be created to facilitate additional patterns in the development of interactive software. For example, a list component can be defined as a container component whose activation triggers the activation of its sub-components in their specified order, and whose deactivation triggers the deactivation of its sub-components in the reverse order. In contrast with sequence components, list components do not introduce any serialization of their sub-components: several sub-components of a list component can be active at the same time.

Because list components are a very natural way to assemble interactive components, the custom component type is defined by some embodiments of the invention as a variant of the list component type that can be used to create new component types.

Programmers can use custom components to create a new component type. To create a new component type, a programmer can create a custom component, add sub-components to it, and specify the name under which the resulting component must be known as the template for said new component type. In addition, programmers can redefine the default activation behavior of a custom component by specifying a new sub-component to replace the START sub-component of said custom component. In the XML examples given in this specification, the tag "<component>" refers to custom components. This ability provides programmers a great flexibility to develop and reuse components customized for their needs. Custom components can be used for example to create complete applications, or sizeable interactive components that constitute parts of an application, or new reusable control structures for special purposes.

A set component is a container component whose activation triggers the activation of its sub-component in no specified order. In some embodiments of the invention the activation order is defined to obey a pseudo-random law. The addition or removal of sub-components to a set produces the activation of respectively a reference property named "ADDED" that contains a reference to the newly added sub-component and a reference property named "REMOVED" that contains a reference to the newly removed sub-component.

Some embodiments of the invention define a "COPY" sub-component in some component types. The COPY sub-component has a reference property named "new". The activation of the "COPY" sub-component of a component triggers the creation of a copy of said component and the change of said "new" property to a reference to the newly created component.

An iterator component type can be defined for each type of container component. An iterator component is defined with a reference to a container component named its source, and has a blank sub-component named its trigger and a reference property named its output. When an iterator is active, every time its trigger is activated its output property receives a new reference to a sub-component of the source of said iterator, if possible. If no new references are available because all have already been used, then the iterator is deactivated when the trigger is activated. Variants of iterator components can be defined so as to never deactivate spontaneously, and instead when the trigger has been activated and no new reference has been written to the output, then any addition of a sub-component to the source of said iterator triggers the writing of a reference to said sub-component in the output of said iterator.

A state machine (or FSM) component is a control structure that manages state changes. A FSM contains sub-components named states, sub-components named transitions, and a property named "state" that contains the name of a state. States are custom components. The value of "state" property of the FSM defines which state of said FSM is active. When said FSM is activated, the state corresponding to the initial value of the "state" property is activated. Transitions are sub-components of states defined with a reference to a component named its source, and the name of a state named its target. A transition behaves is equivalent to the combination of a binding and an assignment: when its source is activated, it modifies the value of the "state" property to the name of its target; this is called the firing of a transition. When a transition is fired, Transitions are defined in some embodiments of the invention to use the same indirection mechanism as properties when used in bindings, so that when a transition is used as the source of a binding, it is its firing that is coupled to the action of said binding. Therefore state machines can be used in various ways. Sub-components can be added to their states so that said sub-components are only active in one state. Alternatively their states can be used as sources in bindings. Alternatively transitions can be used as sources in bindings, so that actions are triggered when said transitions are fired. Alternatively the "state" property of a FSM can be used as the input of a connector.

Figure 8:
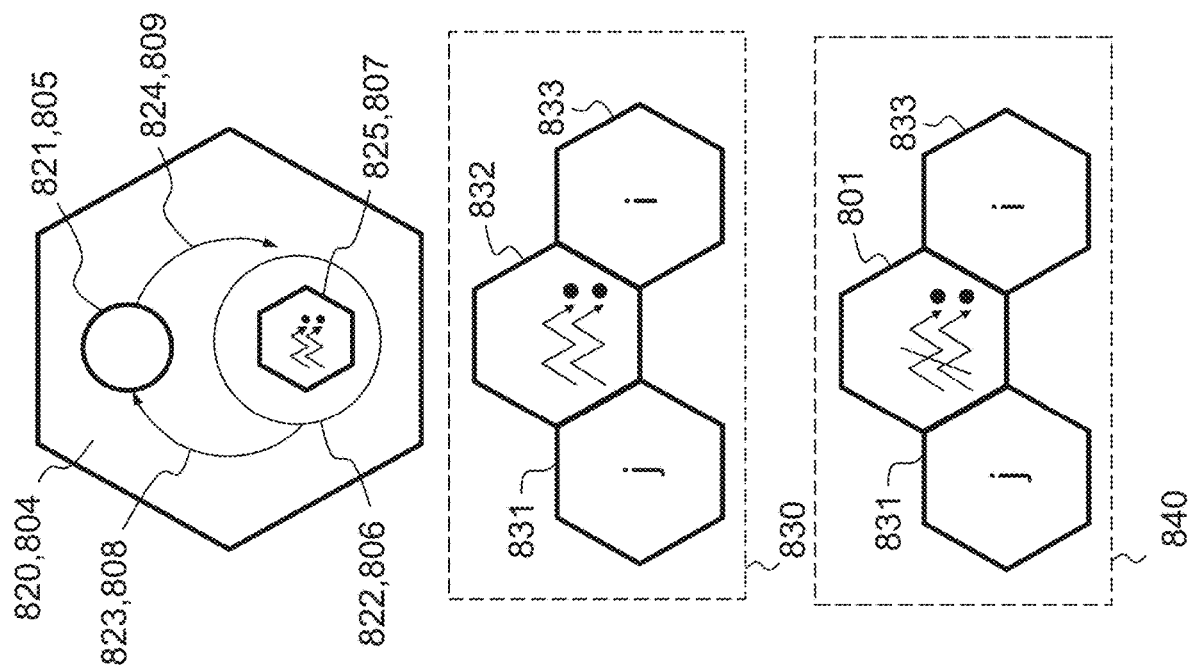
FIG. 8 displays a component that is a variant of a connector component and that propagates only one value change for any sequence of two value changes in its input.
Figure 9:
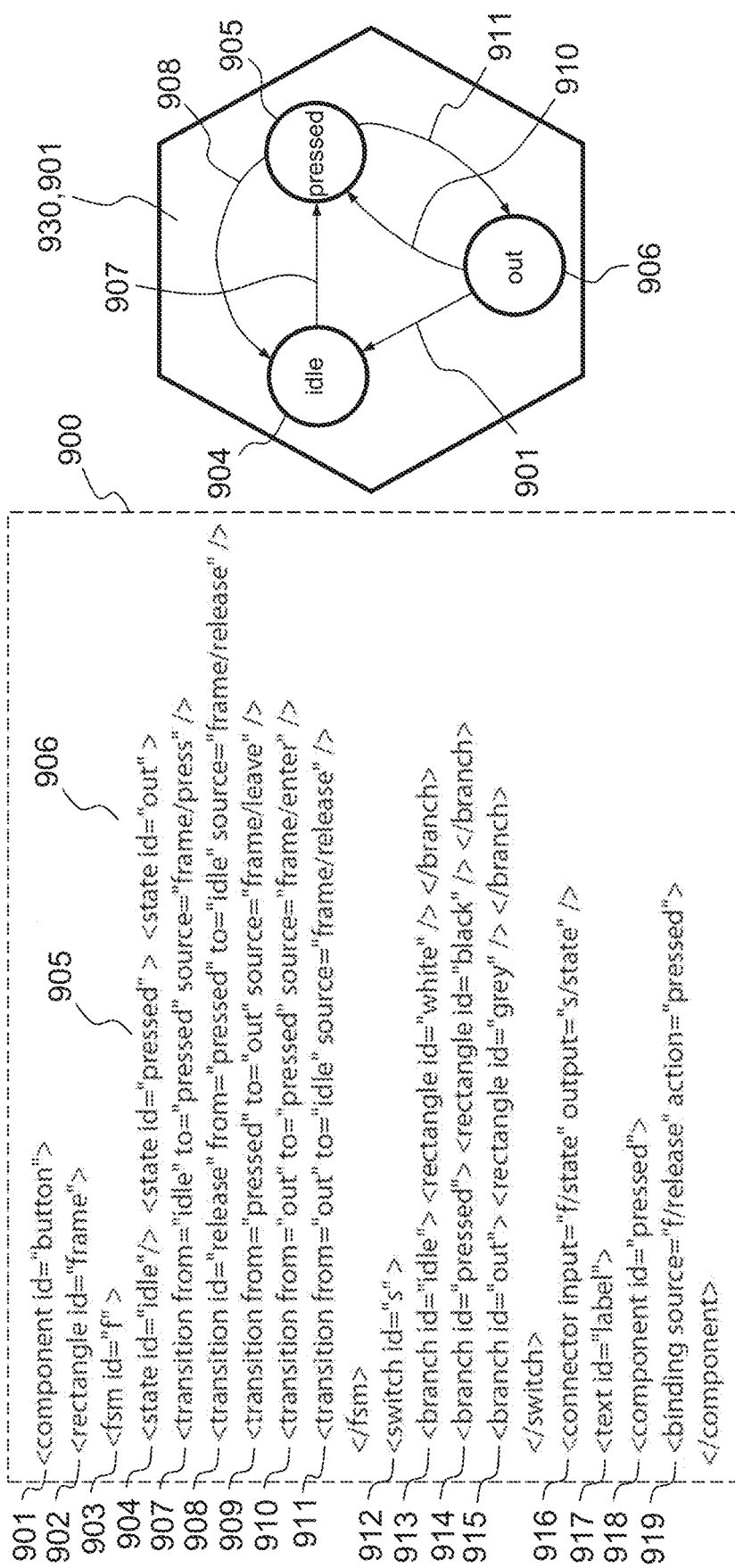
FIG. 9 displays an XML representation of a button component that is built as a custom component.

FIGS. 8 and 9 display examples of FSMs and their use. Petri Net and Statecharts components can be defined as additional control structures similar to FSM components, with different semantics for defining states and transitions.

A switch is a variant of a state machine that has states and no transitions. The states of a switch are also named its branches. As with FSMs, the state property of a switch controls which of its branches is active. Switches can be used for example to apply tests to the results of operations, or in combinations with FSMs.

Since control structures rely on the same basic mechanisms of activation and coupling, programmers can interchange them easily. For example a binding between the position of a pointer and a beeper ensures that any movement of the pointer will trigger a beep. Replacing the binding with a connector between the X coordinate of the position of the pointer and the frequency of the beeper ensures instead that the movements of said pointer control the frequency of said beeper. A multiplicity of control structures can also be used on the same components at the same time. For instance, a configuration can be defined with a binding between the position of a pointer and a beeper, and with connector between the X coordinate of said pointer and the frequency of said beeper. In this configuration, movements of the pointer will trigger sounds and control the frequency of such sounds at the same time. Thus, interactive components according to the invention permit a maximal interoperability of the components and renders the modification of the functionalities of interactive software very easy to perform.

Since control structures rely on the same basic mechanisms of activation and coupling, it is also possible to reduce a program to a collection of couplings and primitive components, in order to perform analyses on the behavior of said program. Reciprocally, it is possible to assemble them in order to produce control structures that have a more complex behavior, and to allow programmers to ignore the internal details of said control structures.

Also, a skilled person can create new reusable control structures by assembling existing control structures, operations and properties in custom components. As a purely theoretical example, FIG. 8 displays a component 801 that is a variant of a connector component and that propagates only one value change for any sequence of two value changes in its input. In 800 an XML representation is given in which 801 appears composed of a property 802, two connectors 803 and 807 and a state machine 804 with two states 805 and 806, and two transitions 808 and 809. Connector 807 is a sub-component of state 806, and consequently it is only active when state machine 804 is in state 806. In 820 is another representation of state machine 804, with its two states 805 and 806 represented as circles 821 and 822, and its two transitions 808 and 809 represented by arrows 823 and 824 respectively. Connector 807 is shown to be a sub-component 825 of state 822-806. Also, the XML representation of component 801 contains two "<alias>" tags 810 and 811 to represent that component 801 has respectively a reference named its input that is identical to the input reference of connector 803 and a reference named its output that is identical to the output reference of connector 807. When connector 803 propagates value changes to property 802, one of the transitions 808 and 809 of state machine 804 is fired, triggering a state change in state machine 804 and consequently the activation or deactivation of connector 807. The value change of property 802 is propagated by connector 807 to its output, and therefore to the output of component 801, only when connector 807 is active, that it for one change out of two. The resulting new control structure can be used to replace any connector as needed. For instance, the configuration shown in 830 where property 831 is connected to property 833 by connector 832 can be modified to produce the configuration 840 where component 801 replaces connector 832.

Also, a skilled person can create reusable components for producing computations or for applying pattern recognition to input. For example, gesture classification can be performed by a component that is connected to the position of a pointer, that contains control structures and computations, and that also contains blank sub-components that represent the different classes of gestures. The role of the control structures and computations in said component is to determine which said class of gestures must be activated after what sequence of pointer positions. When it is connected to the position of a pointer, this gesture classification component can be used as a new input component.

FIG. 9 displays an XML representation of a button component that is built as a custom component.

A skilled person can also create reusable complex components that implement interaction sequences. For example, FIG. 9 displays an XML representation 900 of a button component 901 that built as a custom component containing a rectangle 902 that constitutes its frame, a FSM 903 with three states 904, 905 and 906 and five transitions 907 to 911, a switch 912 with three branches 913 to 915, a connector 916 between the states of FSM 903 and switch 912, a text component 917 that is the label of the button, a blank component 918 named "pressed" and a binding 919. The three states 904 to 906 of FSM 903 are named "idle", "pressed" and "out". The three branches 913 to 915 of switch 912 have the same names "idle", "pressed" and "out". Said branches contain three rectangles named "white", "black" and "grey" that are three possible backgrounds of button 901. The three possible aspects of button 901 are shown in 910. The transitions and states of FSM 903 are shown in the graphical representation 920 of FSM 903. The sources of the transitions are input sub-components of the rectangle 902, for example "frame/press", that correspond to operations of a pointing device on said rectangle. Said operations trigger the activation of said sub-components, which trigger the firing of the corresponding transition. When a transition changes the current state of the FSM 903, the value of said state is propagated to the state of switch 912. The change of state of switch 912 deactivates the current background rectangle and activates a new background rectangle. Therefore, the color of the background of the button visually changes according to the operation of the pointer. In addition, binding 919 ensures that the "pressed" blank sub-component is activated whenever transition 908 is fired. Therefore, any component coupled to the "pressed" sub-component of button 901 is activated when the proper interaction sequence has been performed on said button with a pointer. The resulting button 901 can then be reproduced and reused by applying the same method to create a dialogue box. It is the experience of the applicant that the same method can be used to produce, given any arbitrary component behavior specification, a reusable component or application that conforms to said specification.

In some embodiments of the invention, extension mechanisms allow programmers to create new primitive component types using traditional programming languages. For example, the callback component is a component defined with a reference to a function or procedure of a traditional programming language, and its activation calls said function or procedure. Using callback components helps to create component types for new output modalities. A new output component can be created by assembling properties and coupling them to a callback sub-component that triggers the appropriate functions of the computer or computer peripheral. Similarly, an activation function or procedure is a function or procedure usable from a traditional programming language that triggers the activation of a component. Using an activation function allows programmers to create component types for new input modalities. A new input component can be created by assembling sub-components and controlling the activation of said sub-components by an activation function that is called when a change in the environment is detected.

Callback components and activation functions can also be used so as to reuse existing software without ceasing to benefit from the advantages of the present invention.

In some embodiments of the invention, component types can be assembled in modules, so that when a module is added to a computer the component types contained in said module can be used in software applications. Modules can be created by vendors of embodiments of the invention or by users of said embodiment who wish to share their work with other users.

The examples above demonstrate the ability of interactive components to define all elements necessary for defining interactive applications. More specifically, they are able to define operations, inputs, outputs and interactions while remaining interoperable and interchangeable, and permitting developers and vendors to develop new components for present and future needs.

EXAMPLE EMBODIMENTS OF THE INVENTION

FIGS. 10 to 16 display exemplary architecture for executing an interactive applications and components in a number of embodiments of the invention.

Figure 10:
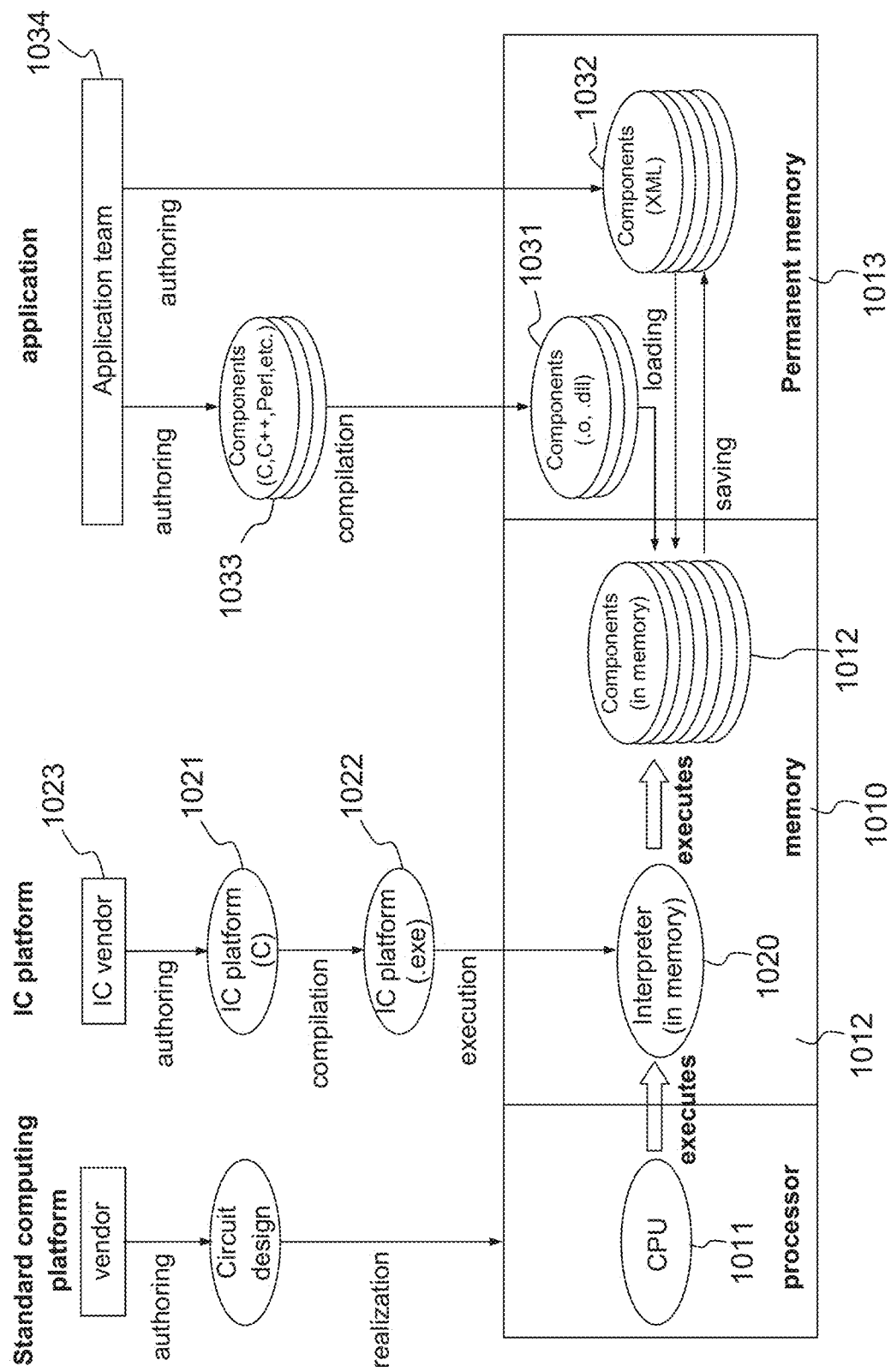
FIG. 10 displays an exemplary architecture for executing interactive applications and components in a number of embodiments of the invention, in which components are executed by an interpreter running as a program on a computer.

FIG. 10 displays an exemplary architecture for executing interactive applications and components in a number of embodiments of the invention, in which components are executed by an interpreter running as a program on a computer.

The architecture 1000 comprises a computer 1010 comprising a processor 1011, a volatile memory 1012 and a non-volatile memory 1013.

The processor 1011 can be processor configurable for executing executable code. It may for example be a Central Processing Unit (CPU) that may be derived from the Von Neumann architecture, the Harvard architecture or the Modified Harvard Architecture.

The volatile memory 1012 is notably used for loading computer programs to be executed and a context of execution of said computer programs. It may for example be Random-Access Memory (RAM), Dynamic Random-Access Memory (DRAM), Thyristor Random Access Memory (T-RAM) or Zero-capacitor (Z-RAM®) memory.

The non-volatile memory 1012 is notably used for permanently storing applications to be run by the computer. It may for example be Read-Only Memory (ROM), a magnetic tape, a hard drive, an optical drive, a Non-Volatile Random-Access Memory (NVRAM), a flash memory, a magnetic tape, a hard drive, an optical disk such as a Compact-Disc (CD), a Digital Versatile Disc (DVD) or a Blu-Ray® Disc, a Programmable Metallization Cell (PMC), a Silicon-Oxide-Nitride-Oxide-Silicon (SONOS) memory, a Resistive Random-Access Memory (RRAM), a Domain-Wall Memory (DWM) or a Floating Junction Gate Random Access Memory (FJG RAM).

In a number of embodiments of the invention, interactive components are organized in a tree such as the tree 100 and are executed by an interpreter running as a program 1020 on the computer 1010. In this architecture the components 1030 and the interpreter program 1020 are loaded in the volatile memory 1012. The processor 1011 executes the interpreter program 1020 which in turn causes the processor 1011 to execute the components 1030. The "IC" acronym used in FIG. 10, and following figures, stands for "Interactive Computing" and is used for generically designing any concept related to Interactive Computing, for example an Interactive Computing platform or an Interactive Computing vendor.

In a number of embodiments of the invention, the interpreter program is a program 1022 executable on the processor 1011 when loaded in the volatile memory 1012. The program 1022 can be for example obtained by compiling source code 1021, for example written in C language by a development team 1023. The components 1030 are loaded in the volatile memory 1012 from components 1031 in an executable form stored in the non-volatile memory 1013, components 1032 in an XML form stored on the non-volatile memory 1013, or a combination thereof. The interactive application is therefore defined by a set of components in an executable form 1031, components in a XML form 1032, or a combination thereof. Components in an executable form 1031 are for example obtained by compiling components 1033 in a source code form, for example in C, C++, Perl or Java. A development team 1034 is therefore able to develop an application by authoring components in XML form 1032, in source code 1033, or a combination thereof. This embodiment is advantageous. Indeed, authoring components in XML form permits a very fast development of components that rely on predefined subcomponents and operations. Meanwhile, authoring components in executable source code permits to develop components that effectuate operations that are not available with predefined components on the target platform. In a number of embodiments of the invention, the interpreter is a web browser. The components may for example be scripts or add-ons of the web browser.

In a number of embodiments of the invention, the interpreter 1020 manages components 1030 as data structures in memory, and manages references to components as pointers to said data structures. In some of these embodiments, the interpreter is able to use at least two methods of representing components in memory.

A first method applies to components for which the only possible interaction is to be activated. In order to ease the reading such components will be referred to as "native components". The first method consists in representing a component by a pointer to a function of the same programming language used to create the interpreter. The interpreter 1020 activates a native component by calling the function that represents it, and by passing the activation context through arguments passed to the function.

A second method consists in maintaining in the memory of the interpreter 1020 a data structure containing the necessary information to execute the behavior of a component. In order to ease the reading these components will be referred to as "normal components". The data structure includes at least a pointer to a data structure named "component class", a pointer to a function named "name resolution procedure", and a pointer to a chained list of subscribers named "subscription list".

More specifically, in a number of embodiments of the invention, the component class contains a table in which are stored a collection of pointers to predefined sub-components that are implemented as functions and are common to all components associated to the same class. Each well-known common predefined subcomponent is assigned a number that determines what cell contains the corresponding function in the table of all component classes associated to components that have said well-known predefined subcomponent. For instance, for all component types provided by the interpreter that can be activated by other components, the component class has a function stored in the first cell of its table, corresponding to the START sub-component. Other examples of well-known common predefined sub-components present in some component classes are STOP, COPY, ADD and REMOVE. When the START, STOP, COPY, ADD or REMOVE sub-component of a component needs to be activated, the interpreter retrieves the corresponding function pointer from the table of the component class of said component and calls it.

The interpreter activates a normal component by retrieving its START sub-component and activating it with the same activation context. This recursive sequence of activations of normal components ultimately leads to the activation of a native START sub-component that produces the desired behavior, under the assumption that the developers of the normal component have programmed its START native sub-component so that it produces the desired behavior for its parent component.

The basic composite components provided by the interpreter, and particularly the list component, have START sub-components that are programmed to as ensure that their appropriate sub-components are activated when said composite components are activated.

The developers of the interpreter can easily choose to change the internal representation of a component from native to normal, if they want the interpreter to reveal more detail about the internal structure of said component.

Said name resolution procedure is used to retrieve sub-components of said normal component from their names. In some components, said name resolution procedure can be implemented as a lookup in an association table maintained in the data structure associated to said component. In other components, said name resolution procedure can be implemented as a query in a relational database. In other components, other resolution methods can be used. For example, an aliasing mechanism can be used to make some sub-components accessible under other names, in order to mask some of the internal complexity of the component.

In addition to the part that is common to all components, the data structure associated to a normal component can contain any data that the interpreter must maintain in order to ensure the proper behavior of the component.

Binding components contain references to their source component and action component. When activated, their START sub-component adds a pointer to the action component to the subscription list of the source component. Other control structures use the same technique to create couplings.

The interpreter ensures that when a first component is activated all the components listed in its subscription list are activated, receiving an activation context that contains the activation context of said first component.

In some embodiments of the invention, the name resolution procedures of components can be extended with a mechanism for naming components that reside in another program, said program being possibly executed on another computer. In these embodiments, the couplings to components residing in another program are not directly realized by way of the addition of a START sub-component to a subscription list. Instead, the pointer stored in the subscription list is that of a data structure that contains the necessary information to route the activation to the other program, using an inter-process communication mechanism as the transport layer for transferring said information. When the program containing the action component receives said information, it activates the action component using its own activation mechanism.

Several property components are provided by the interpreter. Each corresponds to the basic data types of traditional programming languages: Boolean values, integer numbers, floating point numbers, text strings. An additional property component stores a reference to another component. All property components are active when they are created, and have no START sub-component. When the SET sub-component of a property is activated, the interpreter ensures that all components listed in the subscription list of said property is activated, thus allowing properties to be directly used as sources in bindings and other control structures.

In an alternative embodiment of the interpreter, all normal components have two name resolution procedures, used for resolving names used respectively in a source context and in an action context. In most components the two procedures are the same, but in some components one procedure or the other can be programmed to implement an aliasing mechanism so that sub-components are presented under alternative names, including posing as the component itself. For example, in a property the name resolution procedure for source context returns a pointer to the SET sub-component of said property, ensuring that when said property is used as a source, it is its SET sub-component that is the actual source.

Components in the interpreter can be referenced by Universal Resource Identifier references as defined in the URI standard. When the interpreter resolves an URI reference, the root of the URI represents the root component of the application, and the segments in the URI are successively resolved to pointers to components by using the name resolution procedure of the current pointer.

Figure 11:
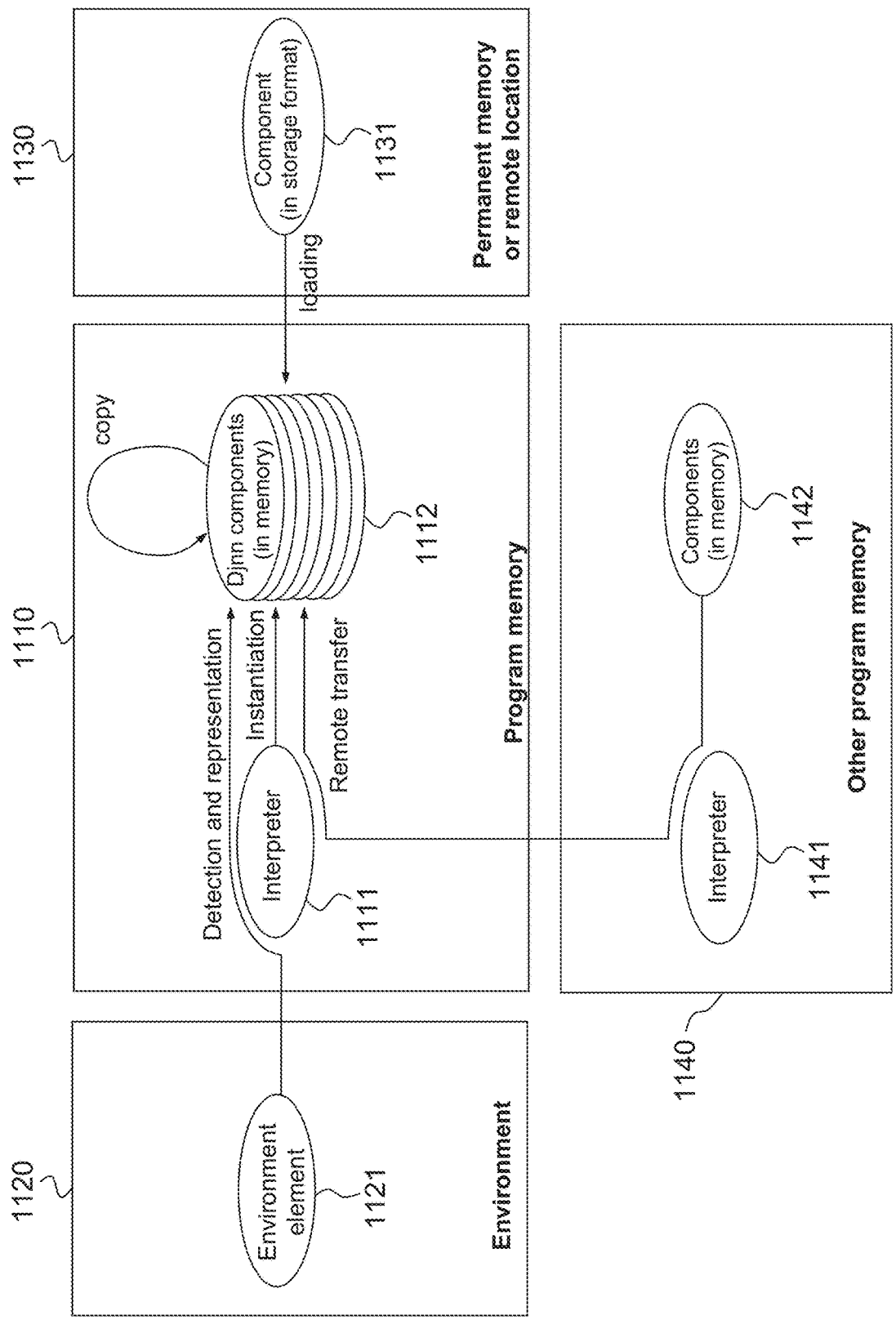
FIG. 11 displays a plurality of locations from which components can be loaded by an interpreter FIG. 12 displays a second architecture for causing a processor to execute an interactive application according to the invention.

Various methods can be used for creating components in an interpreter, as shown in FIG. 11. By means of example components can be copied from components that are already known to the interpreter, received from other interpreters through communication means between programs, loaded from various formats in permanent memory or from remote network locations, created from an existing component type using an Application Programming Interface (API) defined by the interpreter, or automatically created by the interpreter to represent elements of the environment of the software.

The interpreter 1020 loads components from the non-volatile memory 1013. Components can be stored in various formats in the non-volatile memory. By means of example, components may be stored in binary libraries 1031 that the interpreter 1020 loads using the dynamic library loader provided with the operating system of the computer. Components may also be stored in platform-independent formats such as XML 1032 and Json, that the interpreter can load using parsing procedures embedded in said interpreter.

The interpreter 1020 also has the ability to load interactive components from remote network connections using protocols such as HTTP and FTP. Any format usable for storing and retrieving components in permanent memory can be used to retrieve components from said remote location.

The interpreter 1020 also has the ability to use the dynamic loader of the operating system to load binary libraries that contain compiled procedures written in traditional programming languages. Said procedures use the component creation API defined by the interpreter, so that upon the execution of said procedures by the interpreter, the components specified in said procedures are created.

The interpreter 1020 also has the ability to query the operating system for the available hardware devices on the computer, and to use available sensors to detect elements of the execution context and their behavior. Examples of said hardware devices include user input devices, environment sensors, network interfaces, display surfaces and physical effectors. Examples of said elements of the execution context include other programs running on the computer, physical objects or persons detected by sensors, energy sources, and flows of network traffic. For each said hardware device and each said element of the execution context, the interpreter has the ability to create a component whose structure and behavior represents the structure and the behavior of said hardware device or said element of the execution context.

FIG. 11 displays a plurality of locations from which components can be loaded by an interpreter.

The interpreter 1111 is an interpreter of components, for example the interpreter 1020 of the architecture 1000. During its execution it is loaded into a memory area 1110 allocated for its execution. The components 1112 to be executed are loaded in memory.

Components 1112 can for example be loaded from non-volatile memory 1130. It is the case of components 1131 that are part of an application stored on the non-volatile memory 1130.

Components 1112 may also be components 1121 of an environment of execution 1120 of the application. It is for example the case of components that are exposed by the hardware or OS of the computer. For example, if a computer accepts inputs from a mouse, a "mouse" component can be exposed by its operating system, detected and used by the application.

Components 1112 can also be retrieved by exchanges between programs that use interactive components. For example, components 1142 stored in the memory 1140 of an interpreter 1141 and executed by said interpreter 1141 can be copied into the memory 1110 and executed by interpreter 1111. This copy can be performed between two interpreters running on the same machine, or between interpreters on two different machines through a remote transfer.

The reader being supposed to be familiar with the concepts of the invention, other possible architecture for possible embodiments of the invention will now be briefly described.

Figure 12:
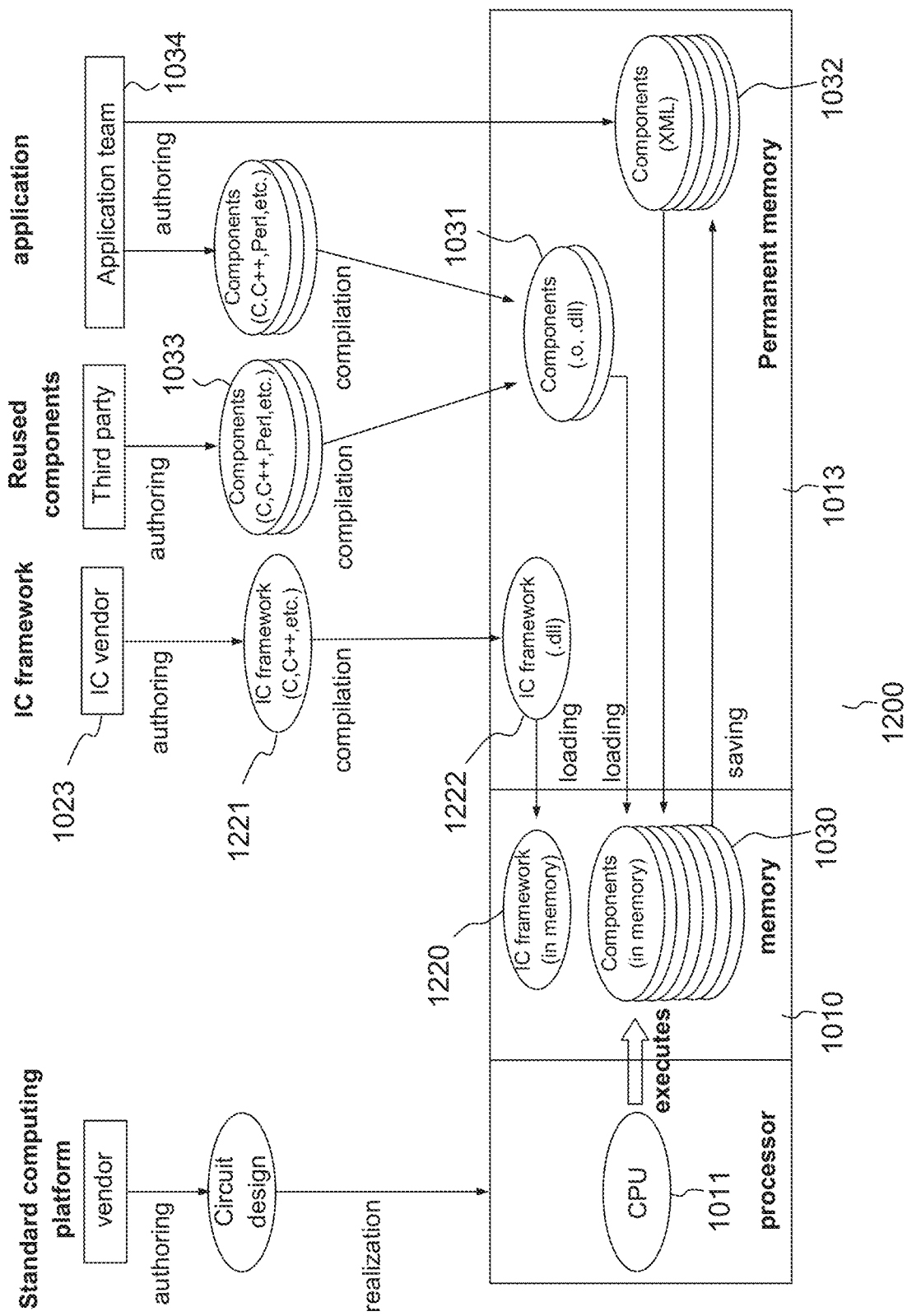

FIG. 12 displays an exemplary architecture for executing interactive applications and components in a number of embodiments of the invention.

FIG. 12 displays an embodiment of the invention wherein application programs are created by linking libraries that implement the interpreter and additional modules, and a program that uses the interpreter API to create components. The djnn programming framework, available at http://djnn.net/, was developed by the applicant for designing interactive applications. The djnn framework follows the architecture 1200, and a skilled person can easily use it to create the architecture 1000.

Similarly to architecture 1000, architecture 1200 comprises a computer 1010 comprising a processor 1011, a volatile memory 1012 and a non-volatile memory 1013; components 1030 in the volatile memory 1012 are loaded from components 1031 in compiled form and components 1032 in XML form in the permanent memory 1013.

Instead of being executed by an interpreter 1020, the components are linked with a framework 1220 obtained by loading dynamic libraries 1222. These libraries can be obtained for example by compiling source code 1221. This embodiment advantageously permits to add or update dynamic libraries more easily. For example, a dynamic library 1222 that contains components for a new peripheral may be downloaded and saved in the memory 1013 when adding said peripheral on the computer.

Figure 13:
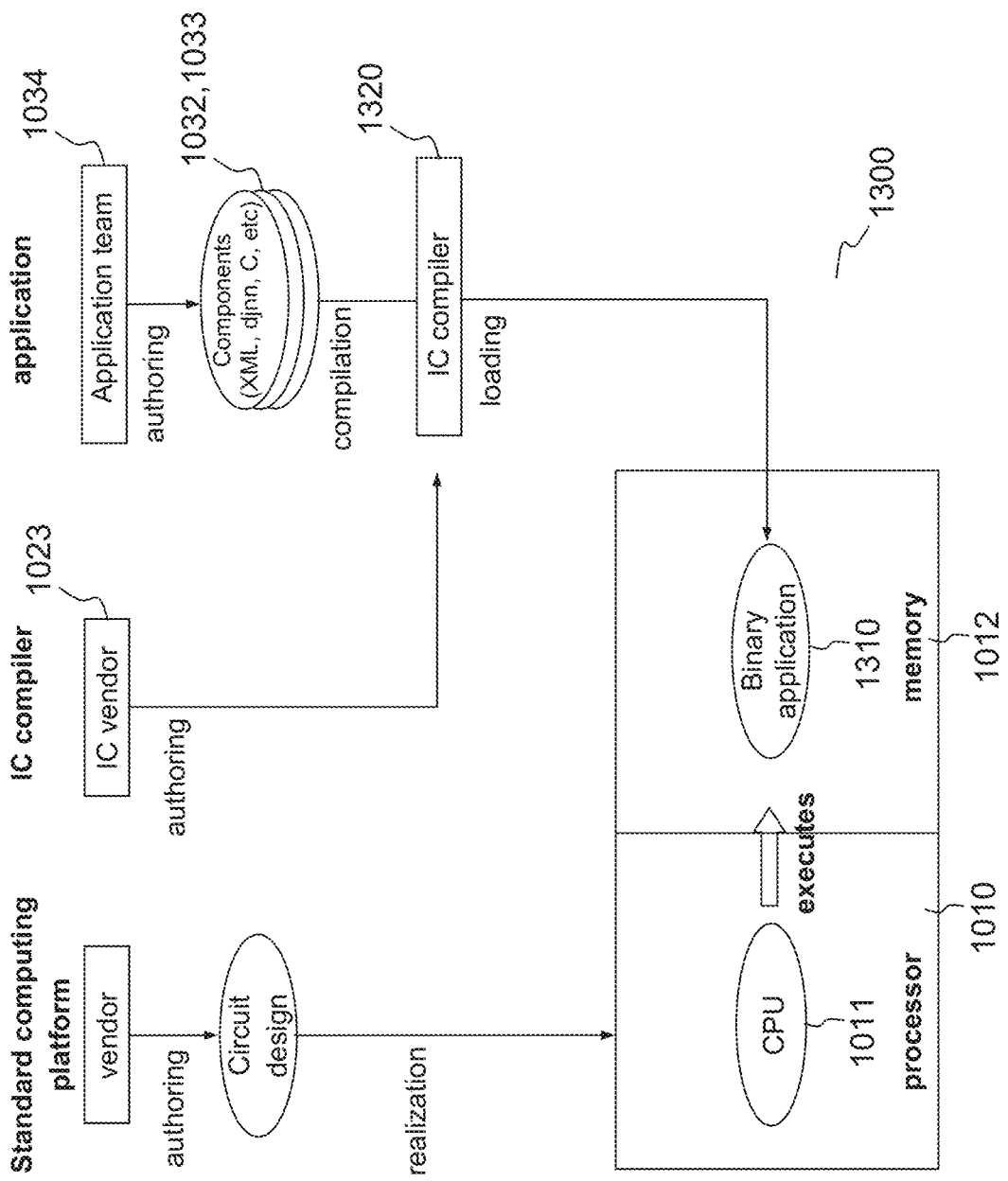
FIG. 13 displays a third architecture for causing a processor to execute an interactive application according to the invention.

FIG. 13 displays an exemplary architecture for executing interactive applications and components in a number of embodiments of the invention, in which components are compiled into an executable form.

The architecture 1300 comprises, similarly to the architecture 1000, a computer 1010 comprising a processor 1011 and a volatile memory 1012. Meanwhile, a development team 1034 can develop an interactive application by authoring components 1032, 1033 in XML and source code forms respectively.

wherein the architecture 1300, interactive components 1032, 1033 are translated by a compiler 1320 into a program 1310 that is directly executable by the computer 1010 and its operating system, and causes the processor 1011 to execute the components. In this embodiment, components can be described in platform-independent formats such as XML and Json, or in dedicated programming languages that programmers use to create and assemble components. The compiler parses the input format to extract the interactive components, and translates them directly to the machine language or the target computer or to a traditional programming language that can be later translated to machine language.

Figure 14:
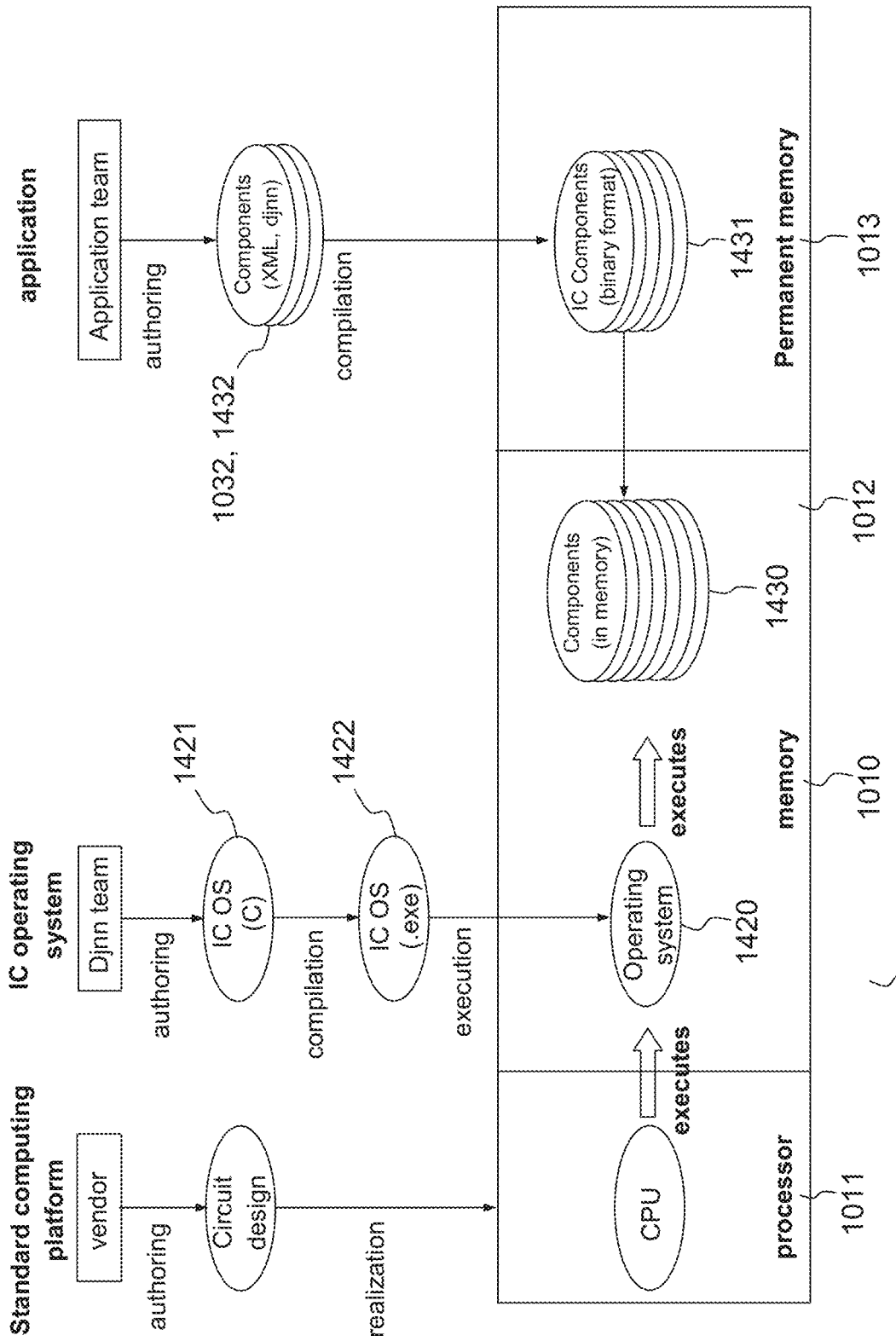
FIG. 14 displays an exemplary architecture for executing interactive applications and components in a number of embodiments of the invention, in which components are compiled into an executable form for an operating system specifically designed for executing interactive components.

FIG. 14 displays an exemplary architecture for executing interactive applications and components in a number of embodiments of the invention, in which components are compiled into an executable form for an operating system specifically designed for executing interactive components.

The operating system 1420 of the computer 1010 is programmed to execute interactive components, in a platform-independent format or in a specific binary code. Components 1431 are stored in non-volatile memory in platform-independent formats 1032 as described above, or are compiled from components 1432 in a specific source code to an executable format specific to said operating system by a specific compiler, and the operating system loads them in memory into components 1430 to execute them. In these embodiments, all the hardware devices of the computer are represented as interactive components that can be coupled to components created by programmers. In a number of embodiments of the invention, the Operating System is an executable program 1422 obtained by compiling source code 1421.

Figure 15:
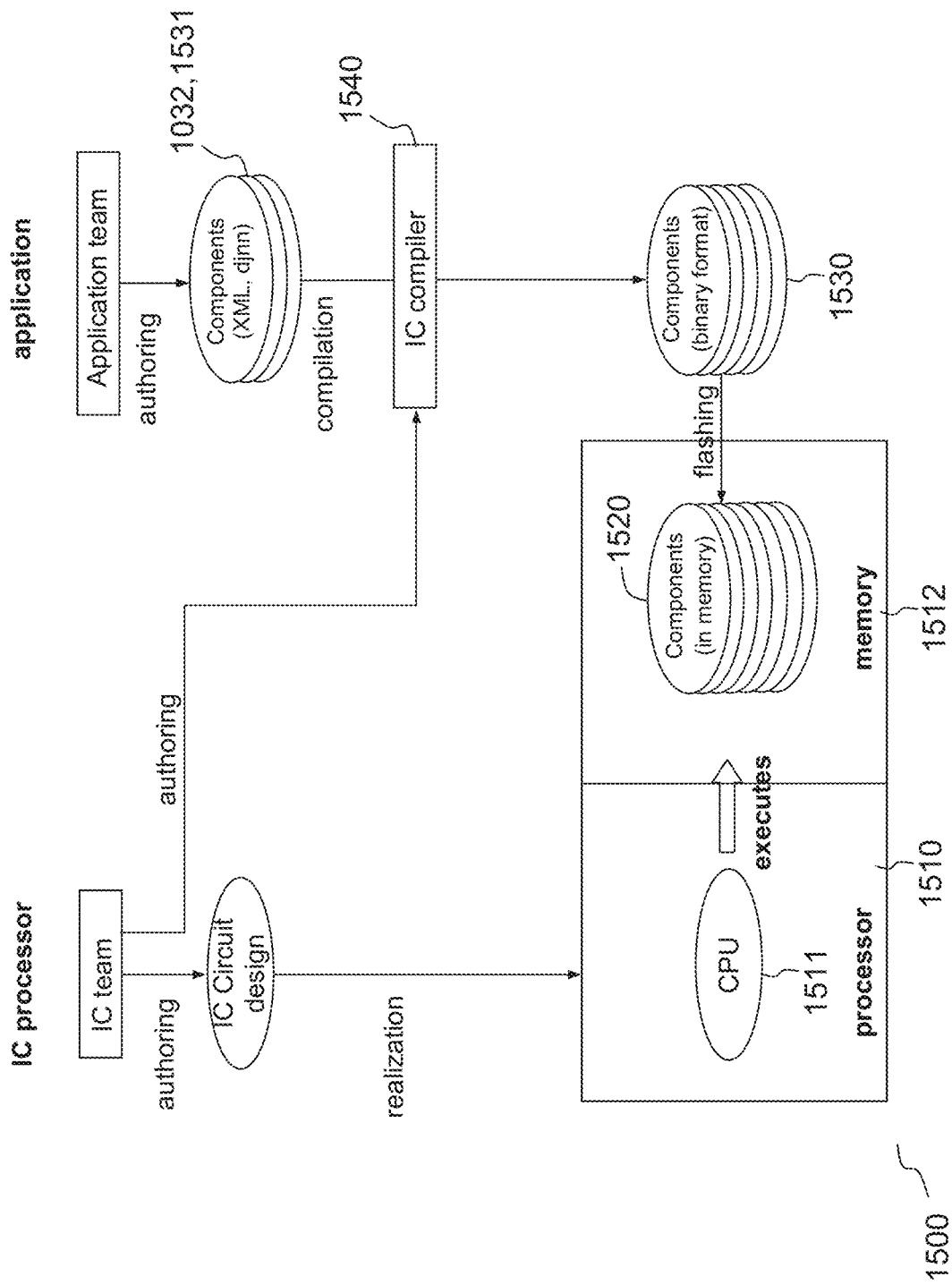
FIG. 15 displays an exemplary architecture for executing interactive applications and components in a number of embodiments of the invention, in which components are compiled into an application directly executable by a processing unit.

FIG. 15 displays an exemplary architecture for executing interactive applications and components in a number of embodiments of the invention, in which components are compiled into an application directly executable by a processing unit.

The architecture 1500 comprises a computing device 1510 having a specialized processor 1511 created for executing interactive components. In this embodiment, components 1032, 1531 can be described in platform-independent formats such as XML and Json, or in dedicated programming languages that programmers use to create and assemble components. A compiler 1540 translates these formats into components in a binary format 1530 that the processor 1511 is capable of executing directly when they are flashed as components 1520 in the memory 1512.

Figure 16:
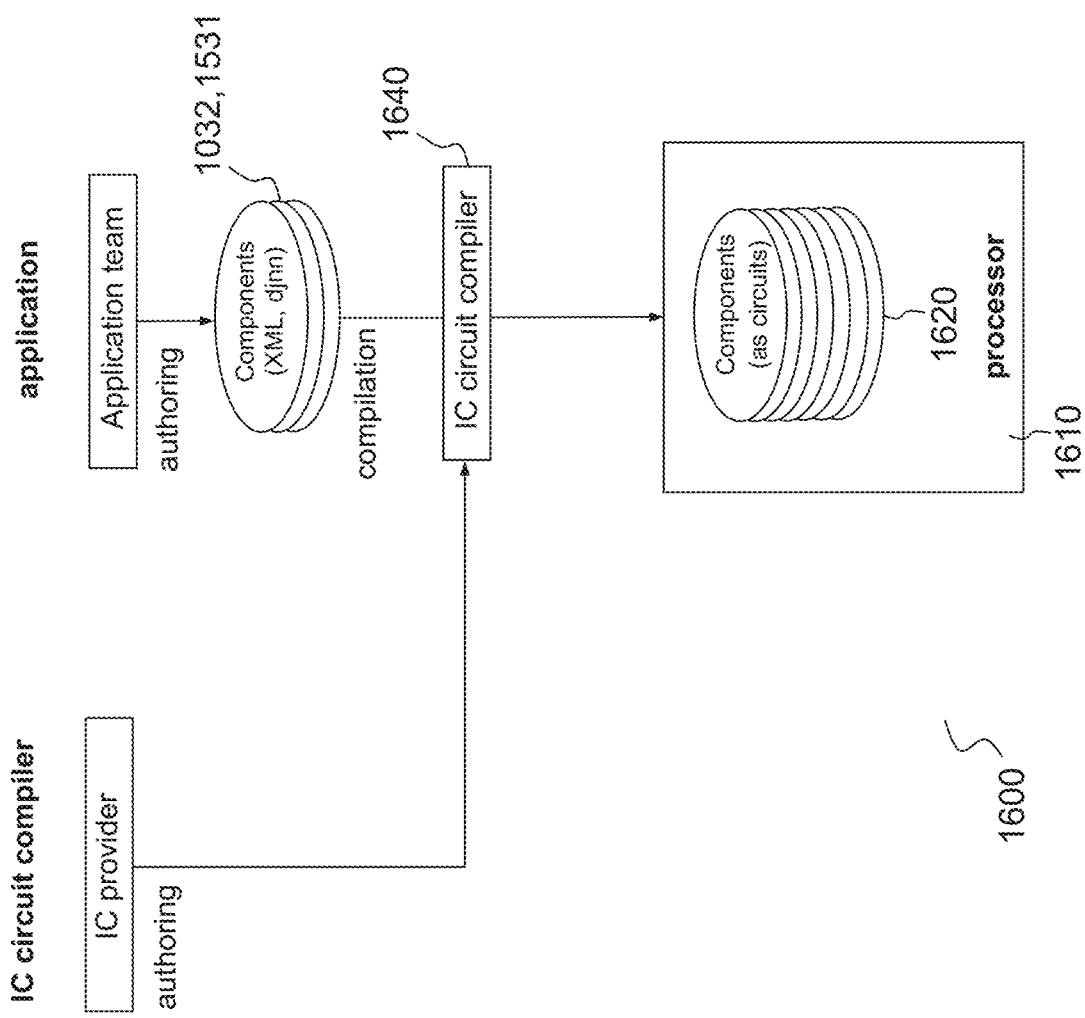
FIG. 16 displays an exemplary architecture for executing interactive applications and components in a number of embodiments of the invention, in which components are compiled into a circuit design of a processing unit.

FIG. 16 displays an exemplary architecture for executing interactive applications and components in a number of embodiments of the invention, in which components are compiled into a circuit design of a processing unit.

The architecture 1600 comprises a processing unit 1610 programmable for directly executing binary code representative of components. In this embodiment, an interactive component and its sub-components are translated by a circuit compiler 1640 into a specialized circuit 1620 of a processing unit 1610 whose behavior is the behavior of said interactive components. For example, a programmable light switch can be programmed as a collection of interactive components, then translated into a specialized circuit 1620 that is small enough to be embedded into wall switches.

The examples described above are given as illustrations of embodiments of the invention. They do not in any way limit the scope of the invention which is defined by the following claims.

Examples of Applications of the Invention

The invention can be used for producing various kinds of interactive systems, using various production processes.

As an example, using the embodiment of the invention displayed in FIG. 12, it is possible to create reusable graphical interactive components similar to those provided in traditional user interfaces toolkits, including but not limited to buttons, dialogue boxes, check-boxes, menus and lists. The states of said components can be represented with state machine components, with the transitions of said state machine or other control structures in the graphical interactive component having the pointing input devices of the computer or their sub-components as their sources. The dependencies between values can be represented with connectors.

Said components can be reused in applications completely programmed using the invention, using all the mechanisms available to store and load interactive components. Alternatively, said components can be reused in programs written in traditional languages, using the API provided by the libraries displayed in FIG. 12 to create the components and connect them to the rest of the application.

Alternatively, the graphical interactive components described above can be created using the invention in a fashion where their graphics sub-components and their behavior sub-components are clearly separated in the tree of sub-components and can be loaded independently, the versions provided originally with the graphical interactive components being used as defaults. This supports various engineering processes in which graphics and behavior, or any other meaningful part of the graphical interactive component is produced independently using dedicated software tools such as graphic design software. This includes but is not limited to: customization by users; concurrent engineering between software design and graphical design during application development; acquisition of graphics or behavior sub-components from third-party sources, either freely or in execution of a contract; adaptation of behavior or graphics at deployment time to the capabilities of the execution platform, for instance the size of the display or the type of pointing device, using different behaviors for touch-based pointing devices and for mouse or equivalent pointing devices.

It is also possible to use any of the above examples of processes to create interactive components dedicated to data management and computation, in order to reuse them in interactive applications using one of the engineering processes described above. Since the invention includes the usual data management, computation and control structure primitives available in traditional programming languages, a skilled person can realize all computations and data representations. Nevertheless, the suggested method for doing so is different from that used with traditional languages, because whereas in traditional computing the call of a function is the only cause of execution, in interactive software any change of data can trigger a reevaluation of the result. The suggested method therefore consists in identifying first which values are susceptible to change independently from each other, before establishing the dependency relationships between these values, the intermediate results, and the results that will be made available, then creating property components to represent these values and results, then creating the computation operators, connectors and other control structure components to represent the desired dependencies and computations. Interacting with the resulting computation or data component will generally be possible by interacting with the properties sub-components that have been defined and that represent inputs and outputs of the computation.

It is also possible to use any of the above examples of processes to create graphical interactive components dedicated to the display of dynamic data, including but not limited to gauges, dials, and histograms. Said components can be connected to any data source, using the API from FIG. 12 to turn said source into an interactive component that can be used in combination with any other interactive component available. For example, given a Web service providing a stream of values a skilled person can easily use a traditional programming language such as C or Java and the API from FIG. 12 to create a component that represents said stream of values and that is activated every time a value is received.

It is also possible to use any of the above examples of processes to create interactive graphical components, or reusable sub-components of thereof, that do not enter the category of software components usually denominated as WIMP (Windows-Icons-Menus-Pointing) and are sometimes categorized as post-WIMP. It is the experience of the inventor that all post-WIMP interactions can be produced with an appropriate combination of interactive components from the invention, with a method that starts with identifying all the relevant perceptible sub-components and all the relevant external components that interact with the component being created, then identifying all the couplings and causality relations between said sub-components and said external components and identifying all the significant states of the component being created, then selecting the appropriate control structures to represent said states and couplings, and the appropriate structure to organize the sub-components.

It is also possible to use any of the above examples of processes to create multimodal interactive components, or reusable sub-components of thereof. A multimodal interactive component is an interactive component that interacts with multiple types of human input components, for example a component that reacts to combinations of gestures and speech, or a component that reacts to combinations of mouse and keyboard, or a component that reacts to combinations of eye gaze detection and tilting of a tablet computer. Some multimodal interactive components can also react to combinations of human input and input from the execution context, for example a combination of CPU temperature and pointer movements that drives the amount of CPU power that the user allocates to a task. Another example is the combination of an external light sensor and of pointer movements that drive the trajectory of a graphical object, said trajectory being exaggerated with additional animated movements when under unfavorable lighting conditions. Creating such multimodal interactive components can be performed using the same method as described above for post-WIMP interactions, with the additional step of creating interactive components to represent input devices or input processing computations that are not yet available. For example, the djnn framework described above provides extensive coverage for standard input devices, but if a custom input device is created using computer capabilities such as its GPIO or SPI interfaces, a skilled person can easily use the C or C++ programming languages and the API from FIG. 12 to create a new interactive component representing said custom input device.

It is also possible to use any of the above examples of processes to create interactive components for self-adaptation, or reusable sub-components of thereof. Self-adaptation is the ability of software to respond to changes in its execution environment and change its own structure and its own behavior. For example, when lighting conditions change the software can replace a text input component with another text input component. The same method described above for post-WIMP interaction and multimodal interaction can be used, where the couplings studied are not only between external components and perceptible sub-components but also between external components and control structures, said control structures being used to determine which sub-component is active at a given time. For instance, a switch component can be connected to a light sensor to control which sub-component is active of the two text input components that are the sub-components of said switch component.

It is also possible to use any of the above examples of processes to create interactive components for realizing or interacting with connected objects. Interacting with connected objects is similar to interacting with input and output devices. Creating interactive components for this can be done using the same method, with the additional step of creating an interactive component to represent each connected object. Creating the software for an interactive object is similar to creating an interactive application on a computer, and consists in creating interactive components that interact with input and output devices. The communication of the connected object with applications residing on remote computers can be realized using the distributed interaction mode described in the invention, or by translating events into a chosen traditional protocol such as REST. The architectures displayed in FIGS. 15 and 16 is particularly adapted for realizing connected objects.

It is also possible to use any of the above example processes to create an interactive component whose sub-components reside on several computing platforms at the same time so as to support distributed interaction. Distributed interaction is an interaction style in which one or more users interact with several computing devices at the same time so as to achieve a task. For instance, a tunnel is a component that is displayed in part on one computer display and in part on another computer display, and when a graphical object is pushed into one side of the tunnel it appears at the other side of the tunnel, triggering the transfer of the data represented by said graphical object from one computer to the other.

It is also possible to rely on the architectures displayed in FIGS. 10 and 12 to create additional modules for the interpreter displayed in FIG. 10 or the programming framework displayed in FIG. 12. Modules can consist of collections of interactive components that support interaction with an input or output device, for example a collection of components that can be used to create sound sequences on a sound card, or a collection of components that represent a professional Web service. Alternatively, modules can consist of collections of interactive components that are composed of predefined sub-components and that support a given interaction style. For instance, a module can contain a collection of reusable WIMP widgets, a collection of data displays, or a collection of gesture recognition components.

It is also possible to rely on the architecture displayed on FIGS. 10 to 16 to create new programming languages. This includes general purpose programming languages for interactive software and programming languages specialized for certain types of interactive software, certain usages of interactive software, or certain classes of users of interactive software. This also includes purely textual languages as well as graphical notations.

An example of such specialized visual or textual programming language is a script language for parameterizing the behavior of an operating system. All operating systems provide several scripting languages for writing so called "script programs" that are started when the computer is started or upon certain events occurring in the computer. Such script programs are used for example to start services, modify the configuration of input devices, sending messages. Script programs can also be written by skilled users to create small portable programs for which general purpose programming languages would be too complex. The limitation of current scripting languages is the absence of support for interaction in most languages, and the limited support in others. Writing interactive scripts would be useful for instance for small programs that require interaction with the user beyond text input and output, for creating custom transformations of input events for people with special needs, Another example of such specialized visual or textual programming language is a language used by end users to program the behavior of their interactive objects and applications. End users could use said language to create simple bindings between events and actions, and also more complex programs based on interactive components that they would create or reuse. Depending on applications, programs written in said language could be stored in devices owned by end users or in servers accessible through network connections.

A benefit of using the invention for the above example of application cases is that, with the exception of components that represent a given hardware device and are programmed in a traditional language, the same components can be reused from one application case to the other, after the appropriate format translation. These components can be, assembled from sub-components created with different tools, shared or sold, validated and certified according to available validation standards, and reused in any of the above examples. This shows how the invention supports an economy based on the exchange of interactive components, similar to what exists for electronics components.

An example of collaborative process based on the invention is a suite of tools for designing and developing interactive software for critical applications.

Another example of collaborative process based on the invention is the creation of interactive applications that reside on network servers that users choose to access and that, when activated, migrate their sub-components in whole or in part to the user's computing device before activating them.

Another example of collaborative process based on the invention is the exchange of interactive components transferred by email, instant messaging system or social network. Whereas current software generally support the exchange of images, documents, the invention would make it easy for a skilled person to create applications where interactive components can be exchanged. For instance, an end user could create and send a simulated envelope that the recipient must open with gestures so that it reveals its contents, or a box with a 4-digit lock that must be open for accessing its contents. The receiving end user can also add the received component to an application that is running on the same computing platform so as to extend its capabilities. For instance, one user can send a zoomable viewport connected to a remote camera situated in a location that he chooses to show, and the receiving user will receive the zoomable viewport as an active component so that she can view the location, and she can add the received viewport to the photo viewing application on her computer so that the location is always visible in the corner of the display.

Another example of collaborative process based on the invention is the creation of interactive spaces created by end users by assembling visual interactive, possibly 3D, components that they create or retrieve, and that they can share with friends. Like in social networks like Second Life where users create customized 3D spaces or Facebook where they create a customized "wall", users could create interactive 3D or 2D spaces to display their photographs in virtual flip boards or puzzles, or their favorite data in a custom visualization that they have created, and invite other users to interact with parts of their private space.

Figure 17:
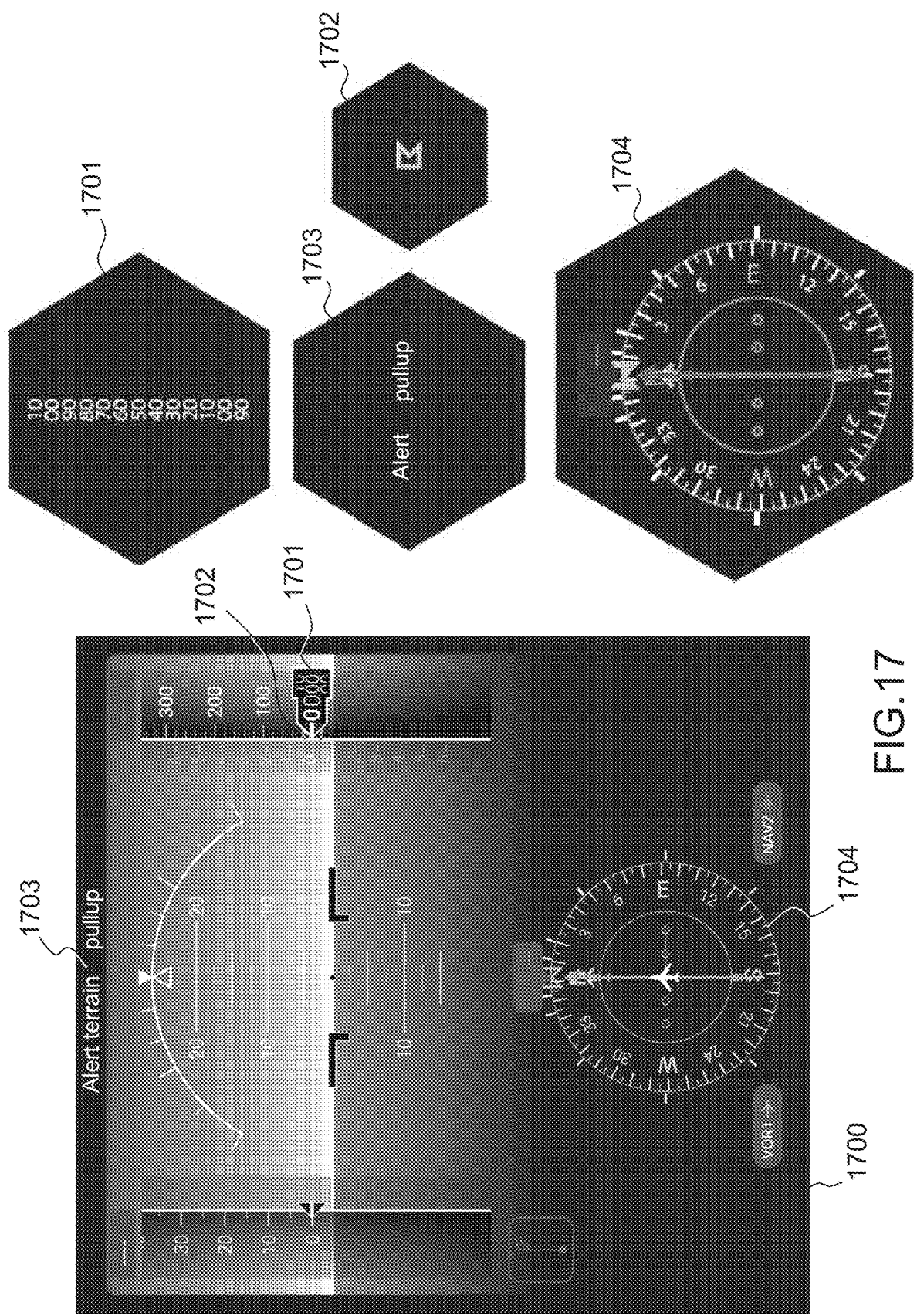
FIG. 17 displays an application that display a Primary Flight Display of an aircraft, built from interactive components in a number of embodiments of the invention.

FIG. 17 displays an application that display a Primary Flight Display of a plane, built from interactive components in a number of embodiments of the invention.

The Primary Flight Display (PFD) 1700 is rendered by assembling interactive components in an embodiment of the invention. It can be used for example in an application of flight simulation.

The PFD 1700 comprises a background with the line of the horizon, the sky and the land, a heading display, an air speed indicator, an altitude indicator 1701, an attitude indicator 1704, an Alert Terrain alarm and a Pull-up alarm 1703.

During the execution of the PFD, the Alert Terrain alarm and Pull-up alarm 1703 must appear as red messages "Alert Terrain" and "Pull-up" when the altitude of the aircraft on which the PFD 1700 is embedded, or for which the PFD is simulated is above a parameter threshold.

FIG. 18 displays an XML that defines components that displaying the alarms in an embodiment of the invention.

The component "alarms" comprises the two alarms 1801 and 1802. A threshold for altitude, and an altitude are defined, and initialized at an arbitrary value. During the execution of the application these values are updated by the environment, for example by setting the value of altitude in the component to the predicted or measured altitude of the aircraft.

A comparator is activated upon a modification of one of its right and left subcomponents, and returns a value "true" if the right subcomponent has a greater value than the left subcomponent.

A connector connects the value of altitude to the left child of the comparator. Thus, the comparator is activated upon each modification of the altitude.

A connector connects the value of the threshold to the right child of the comparator. Thus, the comparator is activated upon each modification of the threshold, and returns a positive value every time the altitude is above the threshold.

The Terrain Alarm component and the Pull-up alarm component define the layout of the alarms, notably the color, font, size and position of the message, which correspond to the red messages in the PFD 1700.

The alarm components 1801 and 1802 are encapsulated within a switch. Thus, they are visible only is the state of the switch is true. The switch is initialized with a false value.

A connector connects the result of the comparator to the state of the switch. Thus, upon each change of the altitude or the threshold, the state of the switch is set to true if the altitude is below the threshold, and false if it is above the threshold, and the alarms are visible if and only if the altitude is below the threshold.

Figure 19:
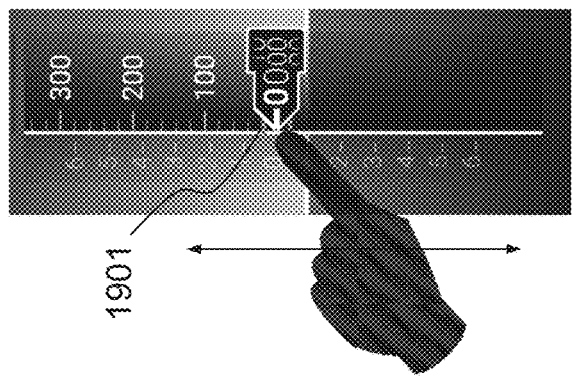
FIG. 19 displays a touch display for setting a target altitude in a Primary Flight Display in an embodiment of the invention.

FIG. 19 displays a tactile display for setting a target altitude of a simulated aircraft in an embodiment of the invention.

The tactile display 1901 is attached to two transitions 1904 and 1905 for pressing and releasing the display, which the selected altitude being copied through the connectors 1902 and 1903 as the target altitude of the aircraft.

Figure 20:
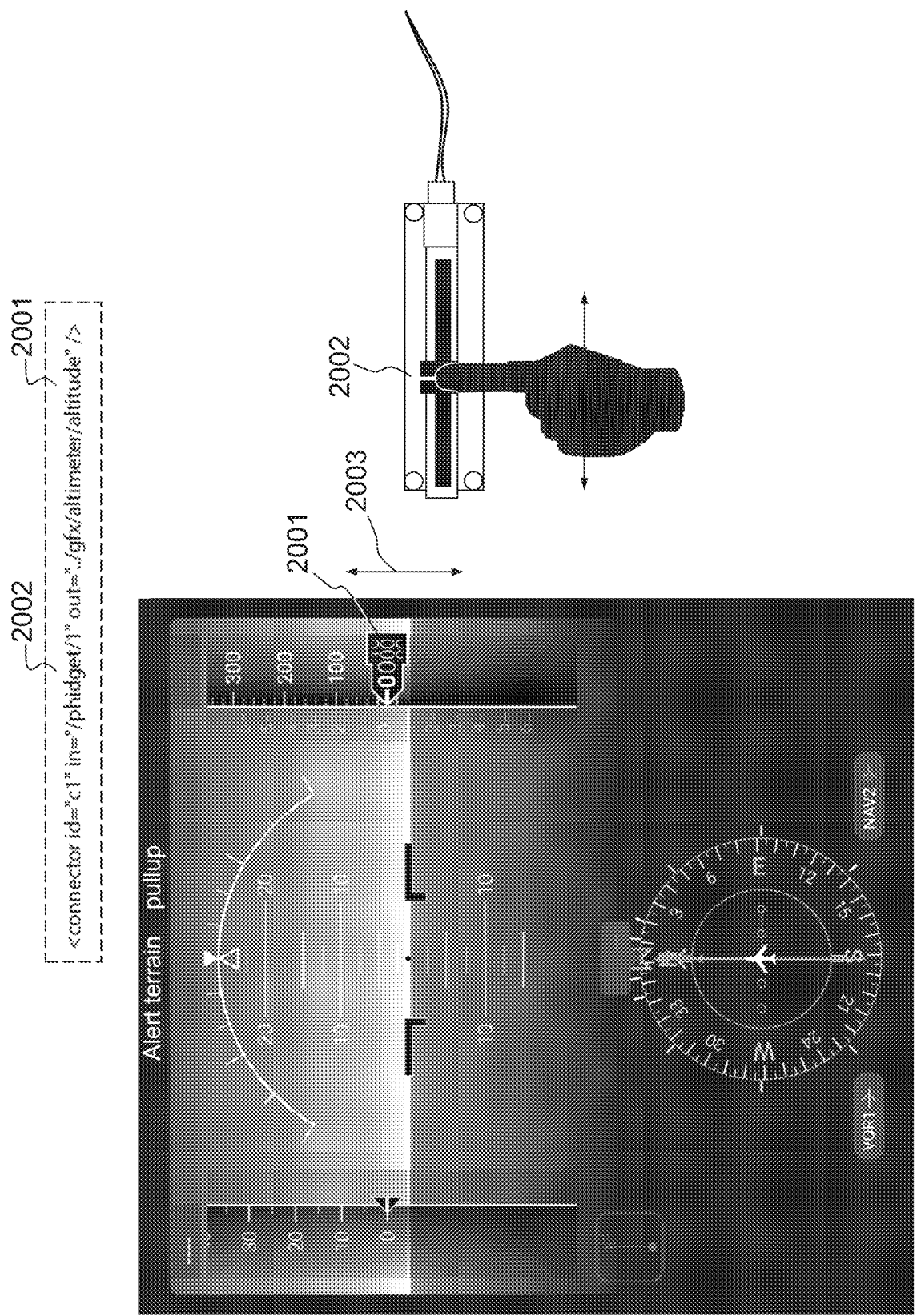
FIG. 20 displays an example of connecting a Phidget for setting the target altitude of Primary Flight Display in an embodiment of the invention.

FIG. 20 displays an example of phidget for setting the altitude of the aircraft for simulation purposes.

The scroll 2002 sets the altitude 2001 through a connector from the phidget 2002 and the altitude 2001. If the altitude goes beyond the threshold, the two alarms are activated. An horizontal modification of the position of the scroll 2002 results in a vertical modification of the altitude 2003.

These examples demonstrate the ability of interactive components according to the invention to create complex applications and interactions. They also demonstrate the ability of interactive components according to the invention to modify the behavior of an application according to inputs from the user or the environment.

The examples of applications described above are given as illustrations of applications of the invention. They do not in any way limit the scope of the invention which is defined by the following claims.

The invention claimed is:

1. An interactive digital system comprising:
   one or more processors;
   a memory for storing a plurality of components to be executed by the one or more processors;
   each component and each subcomponent offering an interface that exhibits:
      an activation state defining whether it is active or inactive; and
      a collection of subcomponents; and
      one or more inputs to set the component active or inactive;
   a first component among said plurality of components being configured to enable a defined interaction between the interactive digital system and an environment of the interactive digital system, the first component comprising a first subcomponent,
   wherein:
      one of the first component and the first subcomponent defines a coupling between a second component and a third component;
      said one of the first component and the first subcomponent is configured, when it is active, to generate an activation of the third component conditional upon an activation of the second component, the activation of the third component conditional upon an activation of the second component enabling the defined interaction, the activation being performed by setting the third component active using the one or more inputs of the interface exhibited by the third component, and wherein:
         the second component is activated, directly or indirectly, upon an input of the digital system and/or;
         the activation of the third component generates, directly or indirectly, an output of the interactive digital system.

2. The interactive digital system of claim 1, wherein the second component is one of the plurality of components, another subcomponent of the first component, a subcomponent of one of an application and an operating system of the interactive digital system.

3. The interactive digital system of claim 1, wherein the third component is one of another subcomponent of the component, a subcomponent of one of an application and an operating system of the interactive digital system.

4. The interactive digital system of claim 1, wherein the first subcomponent is executed by the one or more processors.

5. The interactive digital system of claim 1, wherein being configured to produce the defined interaction results from successive iterations of:
   one of adding a subcomponent to the first component and replacing a subcomponent of the first component by another component;

checking if the first component produces the defined interaction.

6. The interactive digital system of claim 1, comprising a subcomponent representative of one of a variable and an arithmetic operation.

7. The interactive digital system of claim 1, the first component being part of an application, wherein one of the second component and the third component is part of another application.

8. A method for executing a component of an interactive digital system, said interactive digital system comprising a plurality of components, each component and each subcomponent offering an interface that exhibits:
an activation state defining whether the component is active or inactive; and
a collection of subcomponents, and
one or more inputs to set the component active or inactive;
said component being configured to enable a defined interaction between the interactive digital system and an environment of the interactive digital system, said component comprising a first component,
wherein:
one of the component and the first subcomponent defines a coupling between a second component and a third component;
said method comprising:
when said one of the component and the first subcomponent is active, generating an activation of the third component conditional upon an activation of the second component, said activation of the third component conditional upon an activation of the second component enabling the defined interaction, said activation being performed by setting the third component active using the one or more inputs of the interface exhibited by said third component, and wherein:
the second component is activated, directly or indirectly, upon an input of the digital system and/or
the activation of the third component generates, directly or indirectly, an output of the digital system.

9. A non-transitory computer-readable medium comprising computing instructions stored therein, wherein the computing instructions are configured for executing a component of an interactive digital system, said interactive digital system comprising a plurality of components, each component and each subcomponent offering an interface that exhibits:
an activation state defining whether the component is active or inactive; and
a collection of subcomponents, and
one or more inputs to set the component active or inactive;
said component being configured to enable a defined interaction between the interactive digital system and an environment of the interactive digital system, said component comprising a first subcomponent,
wherein:
one of the component and the first subcomponent defines a coupling between a second component and a third component;
said computer program comprises code instructions for, when said one of the component and the first subcomponent is active, generating an activation of the third component conditional upon an activation of the second component, said activation of the third component conditional upon an activation of the second component enabling the defined interaction, said activation being performed by setting the third component active using the one or more inputs of the interface exhibited by said third component, and wherein said computer program comprises code instructions for:
activating, directly or indirectly, the second component upon an input of the interactive digital system and/or
generating, directly or indirectly, an output of the interactive digital system upon an activation of the third component.

10. A processor of an interactive digital system, the processor being configured for executing a component of said interactive digital system, said interactive digital system comprising a plurality of components, each component and each subcomponent offering an interface that exhibits:
an activation state defining whether the component is active or inactive; and
a collection of subcomponents, and
one or more inputs to set the component active or inactive;
said component being configured to enable a defined interaction between the interactive digital system and an environment of the interactive digital system, said component comprising a first component,
wherein:
one of the component and the first subcomponent defines a coupling between a second component and a third component;
said processor is configured for, when said one of the component and the first subcomponent is active, generating an activation of the third component conditional upon an activation of the second component, said activation of the third component conditional upon an activation of the second component enabling the defined interaction, said activation being performed by setting the third component active using the one or more inputs of the interface exhibited by said third component, and wherein said processor is configured for:
activating, directly or indirectly, the second component upon an input of the interactive digital system and/or
generating, directly or indirectly, an output of the interactive digital system upon an activation of the third component.

11. A method for producing a component of an interactive digital system, said interactive digital system comprising a plurality of components, each component and each subcomponent offering an interface that exhibits:
an activation state defining whether the component is active or inactive; and
a collection of subcomponents, and
one or more inputs to set the component active or inactive;
said component being configured to enable a defined interaction between the interactive digital system and an environment of the interactive digital system, said method comprising:
adding to the component a first subcomponent;
Wherein:
one of the component and the first subcomponent defines a coupling between a second component and a third component;
said one of the component and first subcomponent is configured, when it is active, to generate an activation of the third component conditional upon an activation of the second component, said activation of the third component conditional upon an activation of the second component enabling the defined interaction, said activation being performed by setting the third component active using the one or more inputs of the interface exhibited by said third component, and wherein:

the second component is activated, directly or indirectly, upon an input of the interactive digital system and/or the activation of the third component generates, directly or indirectly, an output of the interactive digital system.

\* \* \* \* \*